(12) United States Patent
Sugiyama

(10) Patent No.: US 8,225,254 B2
(45) Date of Patent: Jul. 17, 2012

(54) DELAY PERIOD ANALYZING APPARATUS, DELAY PERIOD ANALYZING METHOD, AND DELAY PERIOD ANALYZING PROGRAM

(75) Inventor: Hiroyuki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 376 days.

(21) Appl. No.: 12/534,970

(22) Filed: Aug. 4, 2009

(65) Prior Publication Data

US 2010/0037192 A1 Feb. 11, 2010

(30) Foreign Application Priority Data

Aug. 7, 2008 (JP) ................................. 2008-204411

(51) Int. Cl.
*G06F 17/50* (2006.01)
(52) U.S. Cl. ........ 716/108; 716/101; 716/106; 716/107; 716/113; 716/134; 716/136
(58) Field of Classification Search .......... 716/100–108, 716/113, 132–136
See application file for complete search history.

(56) References Cited

U.S. PATENT DOCUMENTS

| | | | |
|---|---|---|---|
| 7,239,997 B2 | 7/2007 | Yonezawa | |
| 7,428,716 B2 | 9/2008 | Visweswariah | |
| 2007/0089077 A1 | 4/2007 | Sumikawa | |
| 2007/0150847 A1* | 6/2007 | Ikeda | 716/13 |
| 2007/0226671 A1* | 9/2007 | Hirata | 716/6 |
| 2008/0195941 A1* | 8/2008 | Shibuya et al. | 715/700 |

FOREIGN PATENT DOCUMENTS

| | | |
|---|---|---|
| JP | 2004-252831 | 9/2004 |
| JP | 2004-310567 | 11/2004 |
| JP | 2005-92885 | 4/2005 |
| JP | 2007-109138 | 4/2007 |

OTHER PUBLICATIONS

Akio Miyoshi, et al., "Method for Reducing Irregularities in 65 nm in IBM", Nikkei Microdevices, (Feb. issue) pp. 53-59, Feb. 2006.
A. Nardi et al., "Use of Statistical Timing Analysis on Real Designs", Design Automation, and Text in Europe, pp. 1605-1610, 2007.

* cited by examiner

*Primary Examiner* — Paul Dinh
(74) *Attorney, Agent, or Firm* — Staas & Halsey LLP

(57) ABSTRACT

A apparatus for analyzing a delay in path between flip-flops, including: a calculator that performs delay calculation and generates a delay calculation result on wiring and layout of logic circuits; a analyzer that performs delay analysis for each delay calculation results, and generates delay analysis results for paths by adding delay of logic elements and flip-flops, and by multiplying the sum calculated by a scattering coefficient; a sorter that stores delay analysis results for paths, thereby generating a maximum delay sorting result; a probability calculator that generates probability density functions for paths on a condition by performing processing in which a path is selected from paths in order of maximum delay on the maximum delay sorting result, and a probability density function is generated for the path selected between the flip-flops; and a value calculator that performs maximum value calculation for the probability density functions for all the paths.

18 Claims, 16 Drawing Sheets

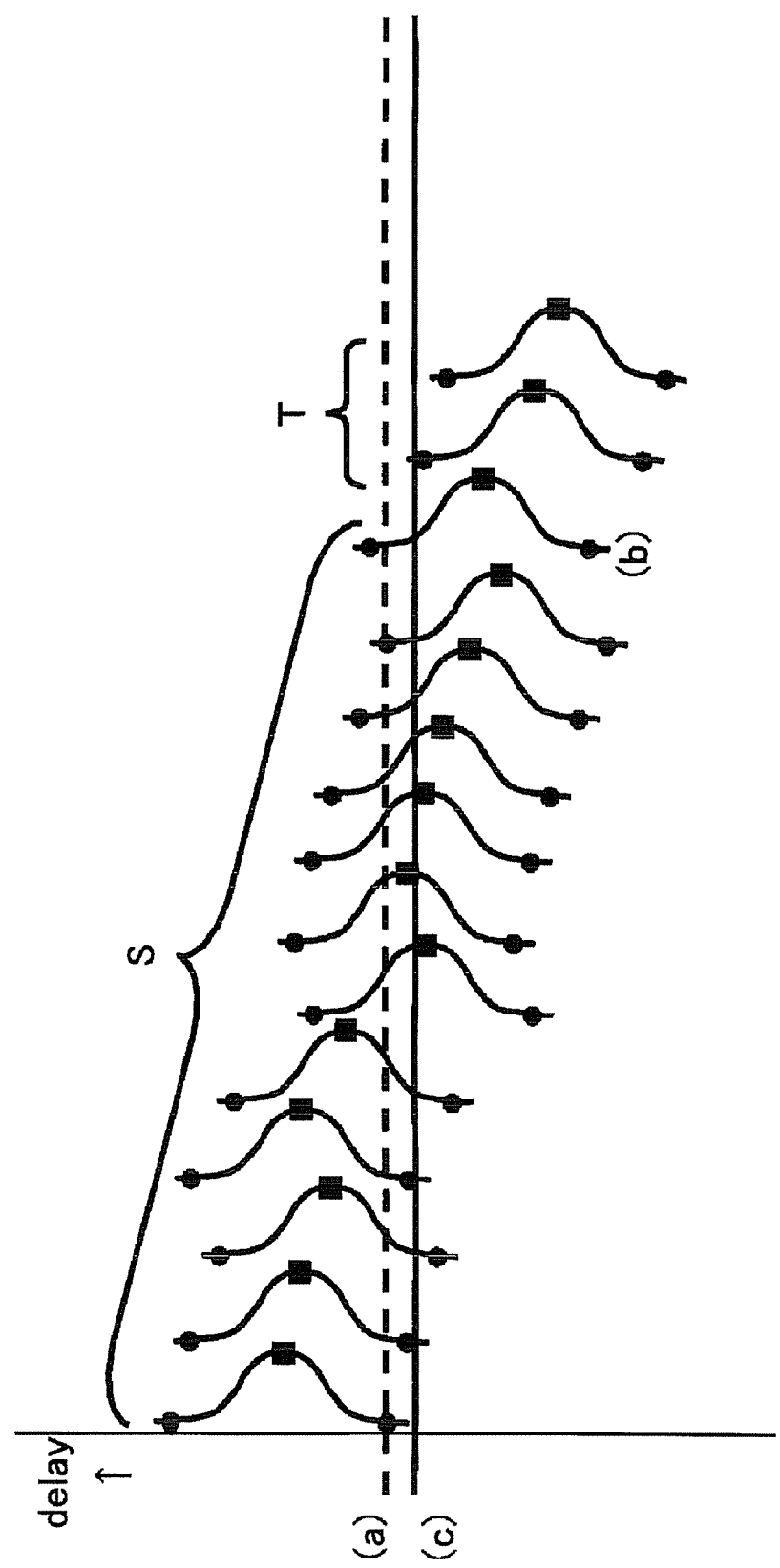

DELAY PERIOD ANALYZING APPARATUS, DELAY PERIOD ANALYZING METHOD, AND DELAY PERIOD ANALYZING PROGRAM

CROSS REFERENCE TO RELATED APPLICATION

This application is based upon and claims the benefit of priority from the prior Japanese Patent Application No. 2008-204411 filed on Aug. 7, 2008, the entire contents of which are incorporated herein by reference.

FIELD

The embodiments discussed herein are related to a technique for delay analyzing apparatus, delay analyzing method, and delay analyzing program for a semiconductor integrated circuit.

BACKGROUND

In general, a technique is known in which, by analyzing delays that occur between flip-flops (which will be referred to as "FFs" hereafter) included in the LSI (Large Scale Integrated circuit), the manufacturing yield of an LSI as a whole is estimated with respect to an operating frequency according to the delay.

Here, the aforementioned operating frequency can be calculated by calculating the inverse of the delay.
[Patent Document 1]
  Japanese Laid-open Patent Publication No. 2004-252831.
[Patent Document 2]
  Japanese Laid-open Patent Publication No. 2004-310567.
[Patent Document 3]
  Japanese Laid-open Patent Publication No. 2005-092885.
[Patent Document 4]
  Japanese Laid-open Patent Publication No. 2007-109138.
[Non-Patent Document 1]
  Akio Miyoshi, Toshihiko Yokota, "method for reducing irregularities in 65 nm in IBM", Nikkei Microdevices (February issue), pp. 53-59, 2007.
[Non-patent Document 2]
  A Nardi, E. Tuncer, et al, "Use of Statistical Timing Analysis on Real Designs", Design Automation and Test in Europe, 2007.

Furthermore, as a method for estimating the manufacturing yield of an LSI as a whole, static timing analysis using an STA (static timing analysis) and statistical timing analysis using an SSTA (statistical static timing analysis) are known, for example.

Static timing analysis using an STA is a method in which a predetermined delay is applied to each gate which is a logic element such as a logical AND circuit (AND circuit), a logical OR circuit (OR circuit), or the like, which is a component of the LSI, and to each net which is a wiring line that connects the gates, and the delays thus applied to the gates and the nets arranged on the paths between the FFs are added, following which the sum thus calculated is multiplied by a predetermined scattering coefficient corresponding to the semiconductor technology used to manufacture the LSI, thereby calculating the delay that occurs on each path between FFs.

On the other hand, statistical timing analysis using an SSTA is a method in which a delay distribution is applied to each gate which is a logic element and which is a component of the LSI, and to each net, and the delay distributions thus applied to the gates and the nets arranged on the paths between FFs are statistically added, thereby obtaining a probability density function for each path between the FFs. Furthermore, the probability density function for the LSI as a whole is obtained by performing a statistical maximum computation on the probability density functions for all the paths between FFs comprising the LSI. Moreover, the cumulative distribution function for the LSI as a whole is obtained by integrating the probability density function for the LSI as a whole. The cumulative distribution function thus obtained represents the yield of the entire LSI with respect to a frequency. Thus, by obtaining the cumulative distribution function, such an arrangement is capable of estimating the manufacturing yield of the LSI.

The aforementioned static timing analysis using an. STA has the advantage of allowing the calculation to be executed with high speed as compared with statistical timing analysis using an SSTA. However, the static timing analysis using an STA is not capable of providing a value closer to the actual value than that provided by the statistical timing analysis using an SSTA, leading to poor precision in the timing analysis.

On the other hand, the aforementioned statistical timing analysis using an SSTA is capable of providing a value closer to an actual value than that provided by the static timing analysis using an STA. However, such an arrangement can execute processing such as addition of the delay distributions with respect to the gates and nets for each path between the FFs, leading to long processing time. Furthermore, in order to improve the calculation precision of the statistical timing analysis using an SSTA, there is a need to increase the number of data points in the delay distributions with respect to the gates and nets for each path between the FFs. However, such an arrangement requires a large amount of execution memory.

Accordingly, it is not practical to apply the statistical timing analysis using an SSTA to all the paths between the FFs that form a large-scale LSI such as multi-core processors or the like having multiple computation cores, which have been put to practical use in recent years.

SUMMARY

According to an aspect of the embodiments, a delay analyzing apparatus includes: a delay calculation unit which performs delay calculation and generates a delay calculation result based upon wiring information with respect to the logic circuit, layout information with respect to the logic elements and the flip-flops, and delay information with respect to the logic elements and the flip-flops, all of which have been input; a delay analyzing unit which performs delay analysis for the multiple paths and generates delay analysis results for the multiple paths by adding the delay information with respect to the logic elements and the flip-flops included in the logic circuit for multiple paths between the flip-flops included in the logic circuit based upon the delay calculation results, and by multiplying the sum thus calculated by a predetermined scattering coefficient that corresponds to the semiconductor integrated circuit; a delay analysis result sorting unit which sorts the delay analysis results for the multiple paths in order of the maximum delay, thereby generating a maximum delay sorting result; a probability density path calculation unit which generates probability density functions for multiple paths between the flip-flops based upon a predetermined condition by repeatedly performing processing in which a path is selected from among the multiple paths in order of the maximum delay based upon the maximum delay sorting result, and a probability density function is generated for the path thus selected between the flip-flops; and a statistical maximum value calculation unit which performs statistical maximum value calculation for the probability density functions for all the paths between the flip-flops thus generated.

The object and advantages of the embodiments will be realized and attained by means of the elements and combinations particularly pointed out in the claims.

It is to be understood that both the foregoing general description and the following detailed description and are exemplary and explanatory and are not restrictive of the embodiments, as claimed.

BRIEF DESCRIPTION OF DRAWINGS

FIG. 16 is a diagram which depicts an example of the probability density function for an FF-FF path generated by the SSTA path calculation unit included in the delay analyzing apparatus as an example of the embodiment.

DESCRIPTION OF EMBODIMENTS

Description will be made below regarding embodiments of a delay analyzing apparatus, a delay analyzing method, and a delay analyzing program, with reference to the drawings.

Figure 1:
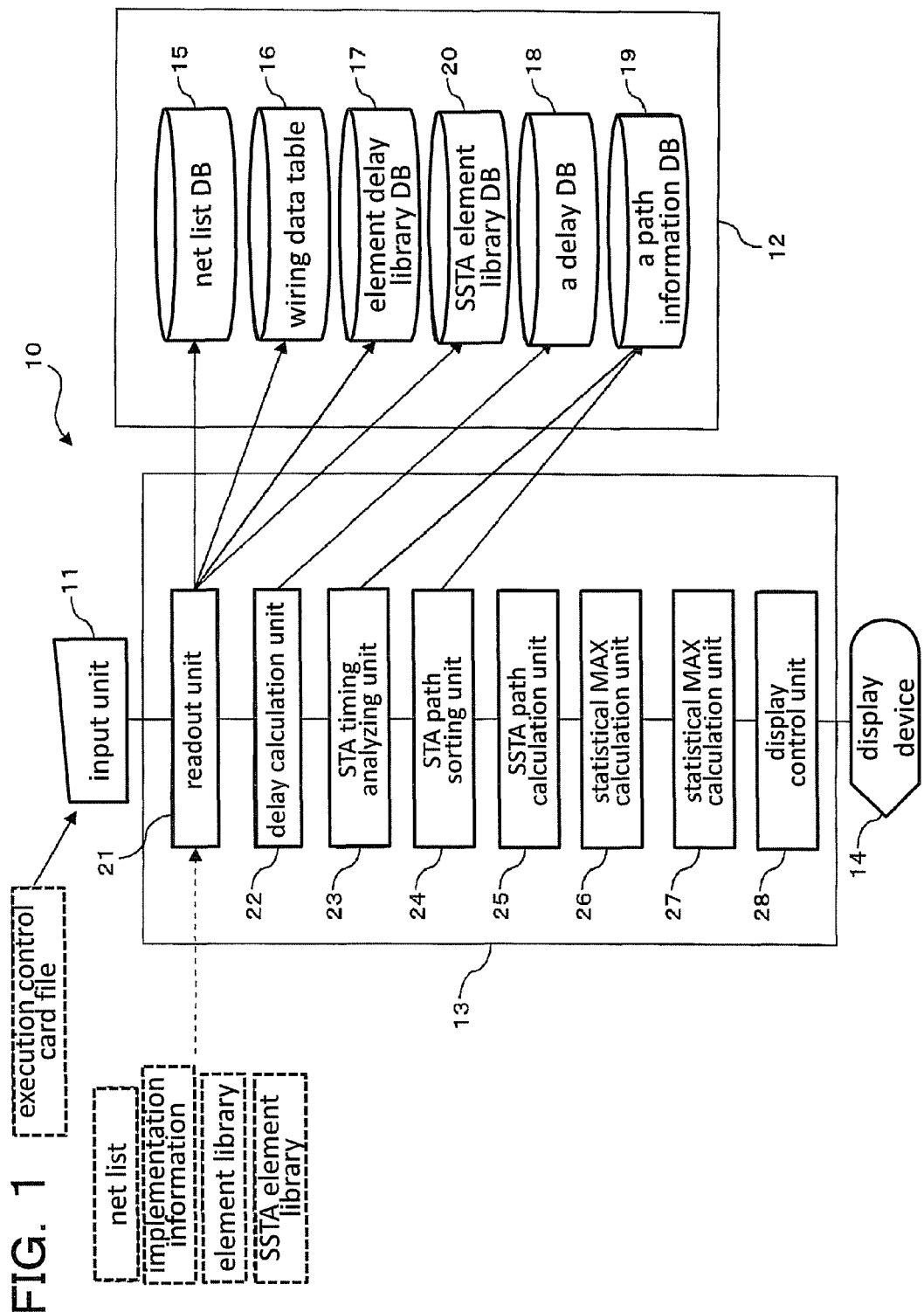
FIG. 1 is a schematic diagram which depicts an example configuration of a delay analyzing apparatus as an example of an embodiment.
Figure 2:
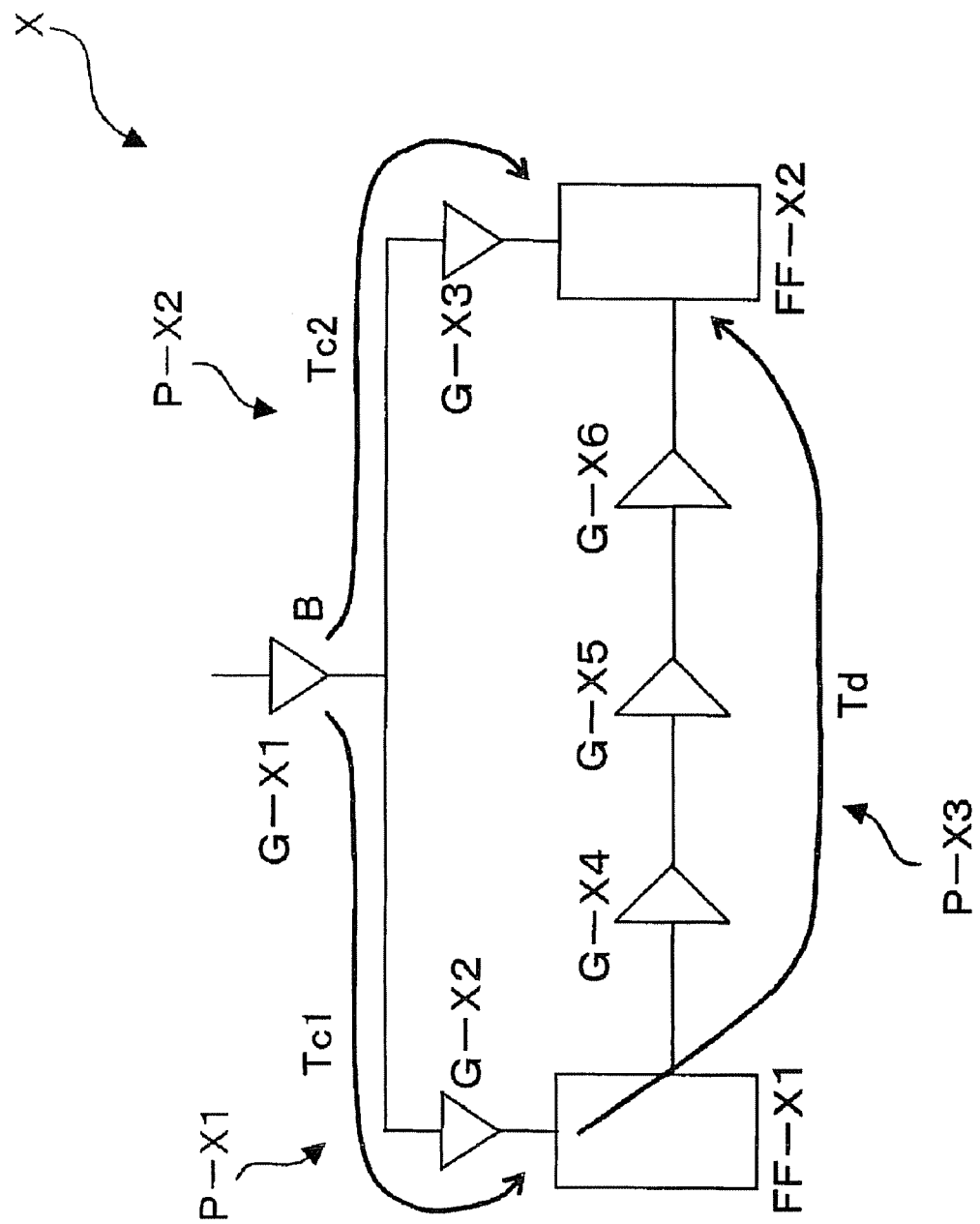
FIG. 2 is a diagram which depicts an example of a net list read out by a readout unit included in the delay analyzing apparatus as an example of the embodiment.
Figure 3:
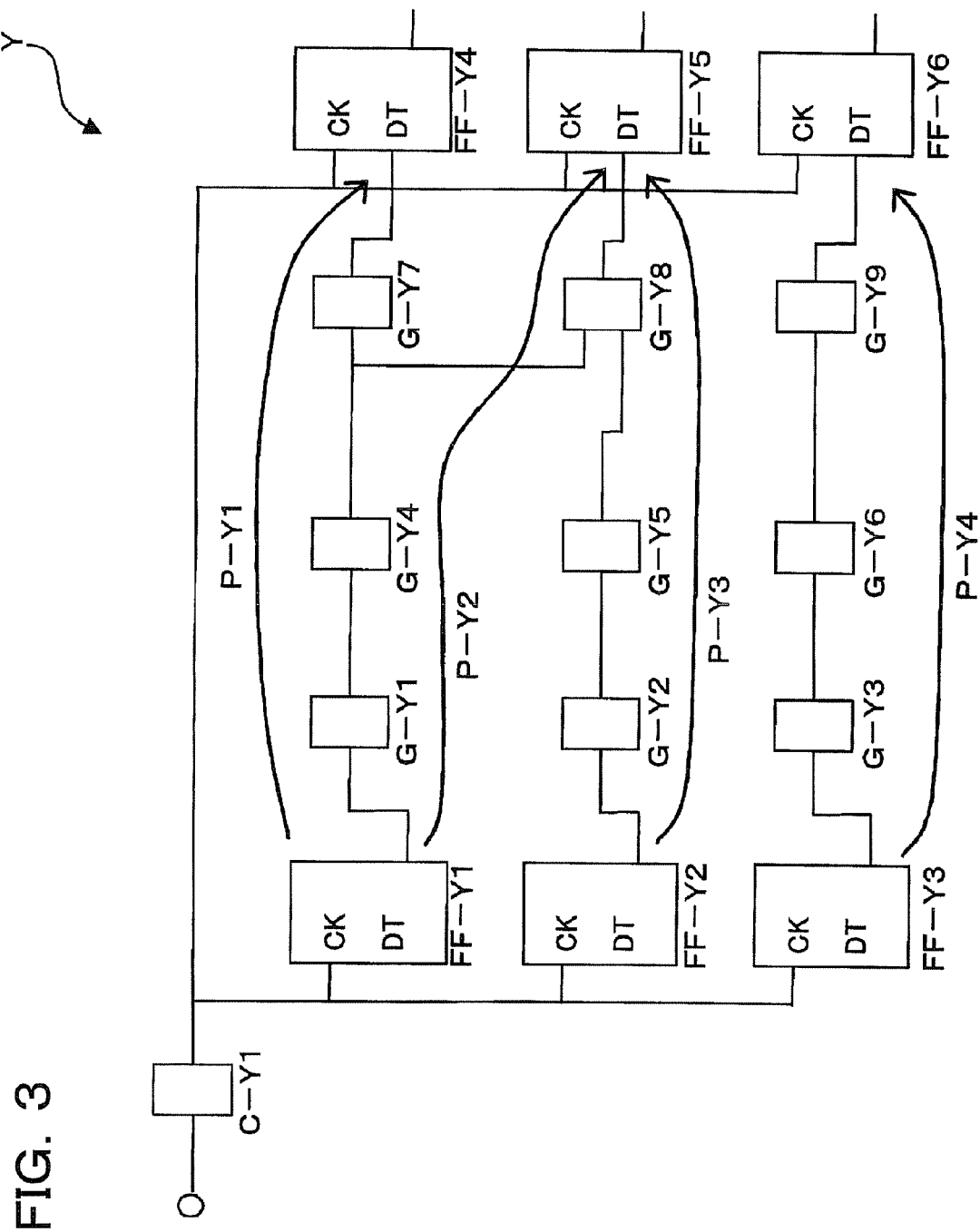
FIG. 3 is a diagram which depicts an example of a net list read out by a readout unit included in the delay analyzing apparatus as an example of the embodiment.

FIG. 1 is a schematic diagram which depicts a configuration of a delay analyzing apparatus 10 as an embodiment. FIG. 2 and FIG. 3 are diagrams which depict an example of net lists each of which is a set of wiring information which is read out by a readout unit 21 and which is to be subjected to delay analysis at the delay analyzing apparatus 10, according to the embodiment.

The delay analyzing apparatus 10 according to the present embodiment analyzes the delays due to paths between flip-flops (which will be referred to as "FF-FF paths"hereafter; see the reference symbols "P-X1" to "P-X3" in FIG. 2, and the reference symbols "P-Y1" to "P-Y4" in FIG. 3, for example) included in a semiconductor integrated circuit (LSI (not depicted)) including a logic circuit (see the reference symbol "X" in FIG. 2 and "Y" in FIG. 3, for example). The logic circuit includes multiple FF-FF paths including logic elements (see the reference symbols "G-X1" to "G-X6" in FIG. 2, and the reference symbols "G-Y1" to "G-Y9" in FIG. 3, for example) and flip-flops (FF; see the reference symbols "FF-X1" and "FF-X2" in FIG. 2, and the reference symbols "FF-Y1" to "FF-Y6" in FIG. 3, for example). The term "FF-FF path" as used here represents a path that connects two flip-flops.

The delay analyzing apparatus 10 is configured as a computer including an input unit 11, a main storage unit 12, a processing unit 13, and a display device (display unit) 14, as depicted in FIG. 1.

Detailed description will be made below regarding the input unit 11, the main storage unit 12, the processing unit 13, and the display device 14.

(1) Input Unit 11

The input unit 11 is a unit for inputting the information used by the processing unit 13. The input unit 11 is implemented as an input device which reads out a command option and an execution control card file.

For example, the input unit 11 is capable of acquiring, from the execution control card file, the cycle time $\tau$ which is information used by an STA timing analyzing unit 23, and a threshold value which is information used by an SSTA path calculation unit 25.

(2) Main Storage Unit 12

The main storage unit 12 is a unit for storing data processed by the processing unit 13. The main storage unit 12 is implemented in the form of a storage device such as an HDD (Hard Disk Drive) or the like.

As depicted in FIG. 1, the main storage unit 12 has a net list DB (database) 15, a wiring data table 16, an element delay library DB 17, a delay DB (delay calculation result storage unit) 18, a path information DB (delay analysis result storage unit) 19, and an SSTA element library DB 20.

(2-1) Net List DB 15

The net list DB 15 stores a net list (logic information) read out by the readout unit 21.

The term "net list" represents the connection relation between the flip-flops and the logic elements included in the logic circuit and, the layout information thereof described in a hardware description language (HDL) such as Verilog or the like (see FIG. 3, for example).

(2-2) Wiring Data Table 16

The wiring data table 16 stores the implementation information (wiring information) read out by the readout unit 21, in the form of a data table including information such as the resistance components R (Resistance) of the wiring, the capacitance components C (Capacitance) thereof, and so forth.

Here, the term "implementation information" represents the information with respect to the resistance component (Resistance) due to the wiring, the capacitance thereof, the inductance thereof, etc., described in the form of an equivalent circuit having a ladder structure. The implementation information is described in the SPEF (Standard Parasitic Exchange Format) file format or the like.

(2-3) Element Delay Library DB 17

The element delay library DB 17 stores an element library read out by the readout unit 21.

The term "element library" represents information which represents properties such as the pin capacitance of each flip-flop and the pin capacitance of each logic element, the driving capacity thereof, and the delay information (delay information) with respect to the delay between an input pin and an output pin, and so forth.

(2-4) Delay DB 18

The delay DB 18 stores the delay calculation result calculated by a delay calculation unit 22. Description will be made later regarding the delay calculation result.

(2-5) Path Information DB 19

The path information DB 19 stores the delay analysis result calculated by the STA timing analyzing unit 23, and the delay analysis result sorted by an STA path sorting unit 24. Description will be made later regarding the delay analysis result.

(2-6) SSTA Element Library DB 20

The SSTA element library DB 20 stores an SSTA element library read out by the readout unit 21

The SSTA element library defines the scattering information with respect to the logic elements. The scattering information is calculated for each logic element using a statistical method such as a Monte Carlo simulation method or the like.

Specifically, the SSTA element library is defined as the following scattering information 1 through 4, for example.

Scattering information 1 (GAI211A, A1, X, du, 0, 0.16, 0.15)

Scattering information 2 (GAI211A, A1, X, ud, 0, 0.19, 0.19)

Scattering information 3 (GAI211A, B1, X, du, 0, 0.15, 0.14)

Scattering information 4 (GAI211A, B1, X, ud, 0, 0.17, 0.17)

The scattering information 1 through 4 includes as its elements that the element name, the input pin name, the output pin name, the signal transition, the offset value, the +3σ value, and the −3σ value, respectively listed in parentheses in this order.

(3) Processing Unit 13

The processing unit 13 executes processing for generating the probability density function (PDF) for an entire semiconductor integrated circuit and the cumulative distribution function thereof. The processing unit 13 is implemented as a processing device such as a CPU (Central Processing Unit) or the like.

As depicted in FIG. 1, the processing unit 13 provides functions as the readout unit 21, the delay calculation unit 22, the STA (static timing analysis) timing analyzing unit (delay analyzing unit) 23, the STA path sorting unit (delay analysis result sorting unit) 24, the SSTA (statistical static timing analysis) path calculation unit (probability density path calculation unit) 25, a statistical MAX calculation unit (statistical maximum value calculation unit) 26, a cumulative distribution function generating unit 27, and a display control unit 28.

(3-1) Readout Unit 21

The readout unit 21 reads out the net list, the implementation information, the element library, and the SSTA element library, from an external source, and instructs the main storage unit 12 to store the information thus read out.

The readout unit 21 reads out the net list from an external device (not depicted in the drawings) via a network, and instructs the main storage unit 12 to store the net list thus read out in the net list DB 15 included in the main storage unit 12.

For example, the readout unit 21 stores the net list for the logic circuit X depicted in FIG. 2 or the net list for the logic circuit Y depicted in FIG. 3 in the net list DB 15.

The logic circuit X has a configuration including two flip-flops FF-X1 and FF-X2 and six gates (logic elements; combinatorial circuits) G-X1 through G-X6.

The gate G-X1 provides a function as a clock signal distribution point (see the reference symbol "B" in FIG. 2) which distributes a clock signal. The flip-flop FF-X1 provides a function as a flip-flop on the data transmission side. The flip-flop FF-X2 provides a function as a flip-flop on the data reception side.

Furthermore, an FF-FF path P-X1 is formed which connects the gate G-X1 to the flip-flop FF-X1 via the gate G-X2. Moreover, an FF-FF path P-X2 is formed which connects the gate G-X1 to the flip-flop FF-X2 via the gates G-X3. Moreover, an FF-FF path P-X3 is formed which connects the flip-flop FF-X1 to the flip-flop FF-X2 via the gates G-X4 through G-X6.

Moreover, the logic circuit Y has a configuration including six flip-flops FF-Y1 through FF-Y6, one clock circuit (logic element) C-Y1, and nine gates G-Y1 through G-Y9. Furthermore, the clock circuit C-Y1 is connected to the CK terminal of each of the six flip-flops FF-Y1 through FF-Y6.

The flip-flops FF-Y1 through FF-Y3 provide a function as a flip-flop on the data transmission side for transmitting data. The flip-flops FF-Y4 through FF-Y6 provide a function as a flip-flop on the data reception side for receiving data.

Furthermore, an FF-FF path P-Y1 is formed which connects the output terminal of the flip-flop FF-Y1 to the DT terminal of the flip-flop FF-Y4 via the gates G-Y1, G-Y4, and G-Y7. Moreover, an FF-FF path P-Y2 is formed which connects the output terminal of the flip-flop FF-Y1 to the DT terminal of the flip-flop FF-Y5 via the gates G-Y1, G-Y4, and G-Y8. Moreover, an FF-FF path P-Y3 is formed which connects the output terminal of the flip-flop FF-Y2 to the DT terminal of the flip-flop FF-Y5 via the gates G-Y2, G-Y5, and G-Y8. In addition, an FF-FF path P-Y4 is formed which connects the output terminal of the flip-flop FF-Y3 to the DT terminal of the flip-flop FF-Y6 via the gates G-Y3, G-Y6, and G-Y9.

Furthermore, the readout unit 21 reads out the implementation information from an external device via a network, and stores the information thus read out in the wiring data table 16 included in the main storage unit 12. Moreover, the readout unit 21 reads out the element library from the external device via the network, and stores the information thus read out in the element delay library DB 17 included within the main storage unit 12. In addition, the readout unit 21 reads out the SSTA element library from the external device via the network, and stores the SSTA element library thus read out in the SSTA element library DB 20 included within the main storage unit 12.

(3-2) Delay Calculation Unit 22

Figure 4:
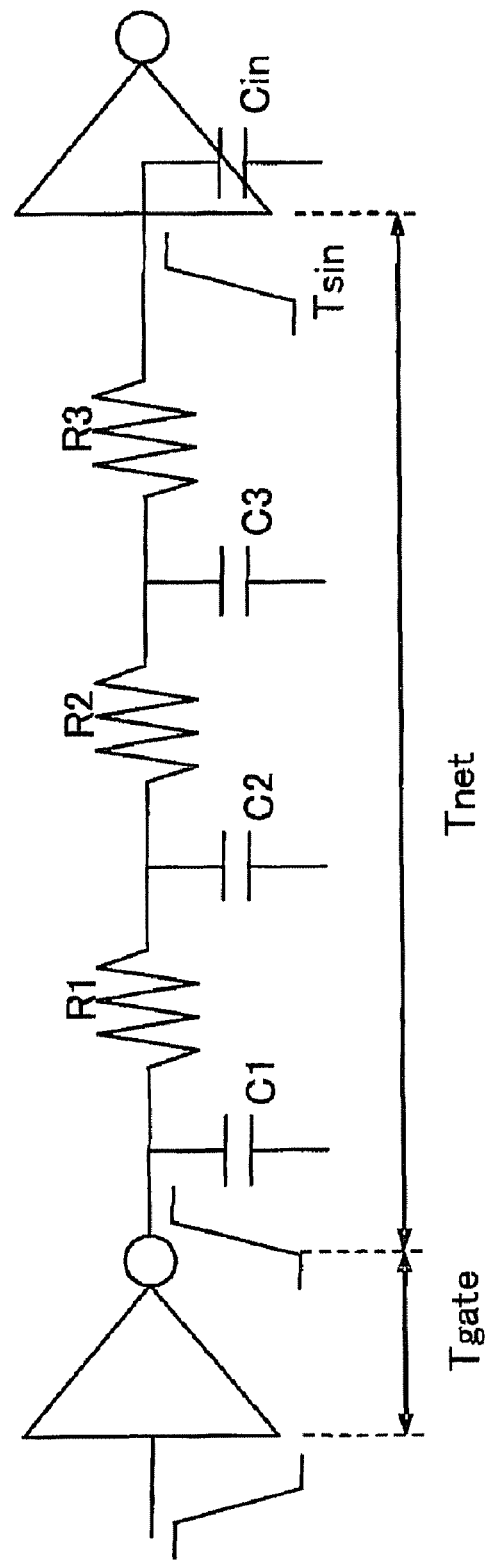
FIG. 4 is a diagram for describing a delay calculating method used by a delay calculation unit included in the delay analyzing apparatus as an example of the embodiment.

FIG. 4 is a diagram for describing a delay calculation method used by the delay calculation unit 22 included in the delay analyzing apparatus 10, as an example of the embodiment.

The delay calculation unit 22 performs delay calculation based upon the wiring information with respect to the logic circuit, the layout information with respect to the logic elements and the flip-flops, and the delay information with respect to the logic elements and the flip-flops, thus read out, and generates the delay calculation result.

In the present embodiment, the delay calculation unit 22 generates the delay calculation result for each of the gates and flip-flops included in the logic circuit and the wiring lines (which are also referred to as the "nets") which connect these elements.

The delay calculation unit 22 calculates the delay for each of the gates, the flip-flops, and the nets specified in the net list, based upon the net list, the implementation information, and the element library stored in the main storage unit 12, for example. The delay calculation unit 22 stores each delay calculation result in the delay DB 18.

For example, description will be made regarding a circuit model including, as a downstream circuit, a distribution constant circuit having a gate output. In this example, the delay calculation unit 22 generates each delay calculation result by calculating the delay (pin-to-pin delay; see "Tgate" in FIG. 4) that occurs between the input pin and the output pin of the gate, the delay due to the net (see "Tnet" in FIG. 4), and the degree of dullness of the waveform (Slew rate/Tsin).

(3-3) STA Timing Analyzing Unit 23

The STA timing analyzing unit 23 performs delay analysis with respect to the multiple paths by adding the respective delay information for the logic elements and the flip-flops included in the logic circuit for the multiple paths between the flip-flops included in the logic circuit based upon the delay calculation result, and by multiplying the sum thus calculated by a predetermined scattering coefficient that corresponds to the semiconductor integrated circuit, thereby generating the delay analysis result for the multiple paths.

In the present embodiment, the STA timing analyzing unit 23 calculates the delay for each of all the FF-FF paths included in the logic circuit by performing static timing analysis (STA timing check) using the STA as delay analysis, thereby generating an STA calculation result for each path as a delay analysis result.

Description will be made below regarding a specific analyzing method for the static timing analysis using the STA with reference to an arrangement employing the logic circuit X depicted in FIG. 2 as an example.

First, as depicted in FIG. 2, the STA timing analyzing unit 23 performs path tracing processing for the FF-FF path P-X1 and the FF-FF path P-X2, thereby calculating the clock path delay value Tc1 due to the FF-FF path P-X1 and the clock path delay value Tc2 due to the FF-FF path P-X2.

Next, the STA timing analyzing unit 23 performs path tracing processing for the FF-FF path P-X3, thereby calculating the data path delay value Td due to the FF-FF path P-X3.

Then, the STA timing analyzing unit 23 performs calculation represented by the following Expression (1) in order to perform a timing check that takes the worst case into account, thereby obtaining the timing constraint value Tpd for the FF-FF path.

$$Tpd=(Tc1+Td)\times\beta\max-Tc2\times\beta\min+T\text{setup} \quad (1)$$

Tsetup represents the setup time for the flip-flop FF_X2 on the data reception side. βmax and βmin represent scattering coefficients.

Then, the STA timing analyzing unit 23 uses the following Expression (2) to perform a setup time check.

$$Tpd\leq\tau(\text{cycle time}) \quad (2)$$

If the Expression (2) is satisfied, the logic circuit is operating in the normal state.

Thus, the timing constraint value Tpd for an FF-FF path included in the logic circuit is generated as the STA calculation result.

Figure 5:
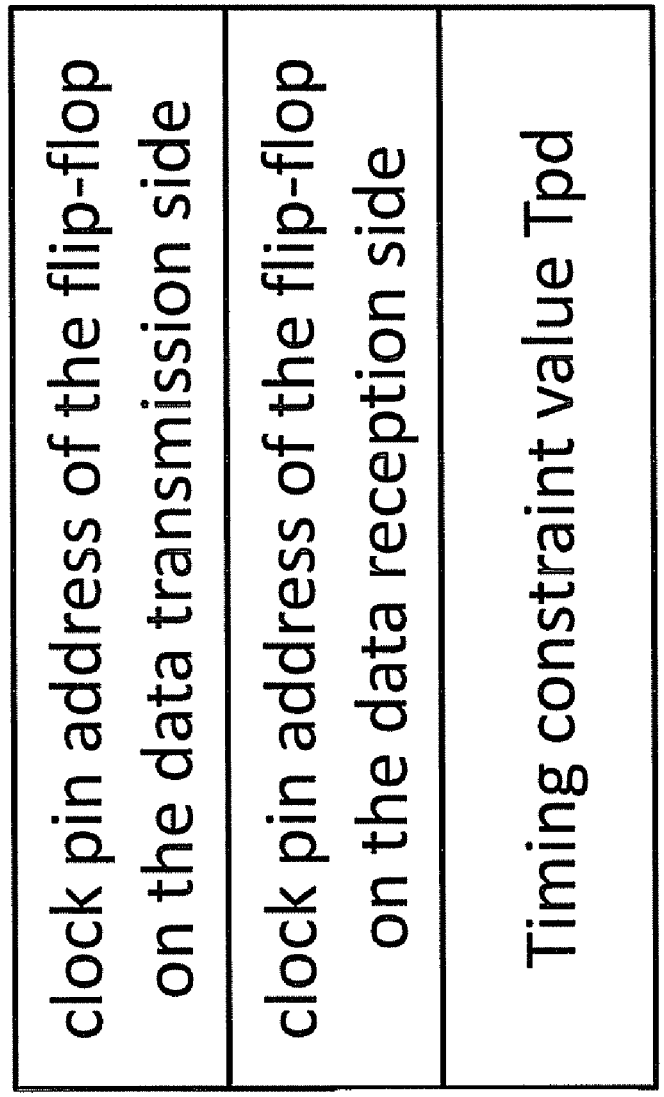
FIG. 5 is a diagram which depicts an example of the delay analysis result generated by an STA timing analyzing unit included in the delay analyzing apparatus as an example of the embodiment.
Figure 6:
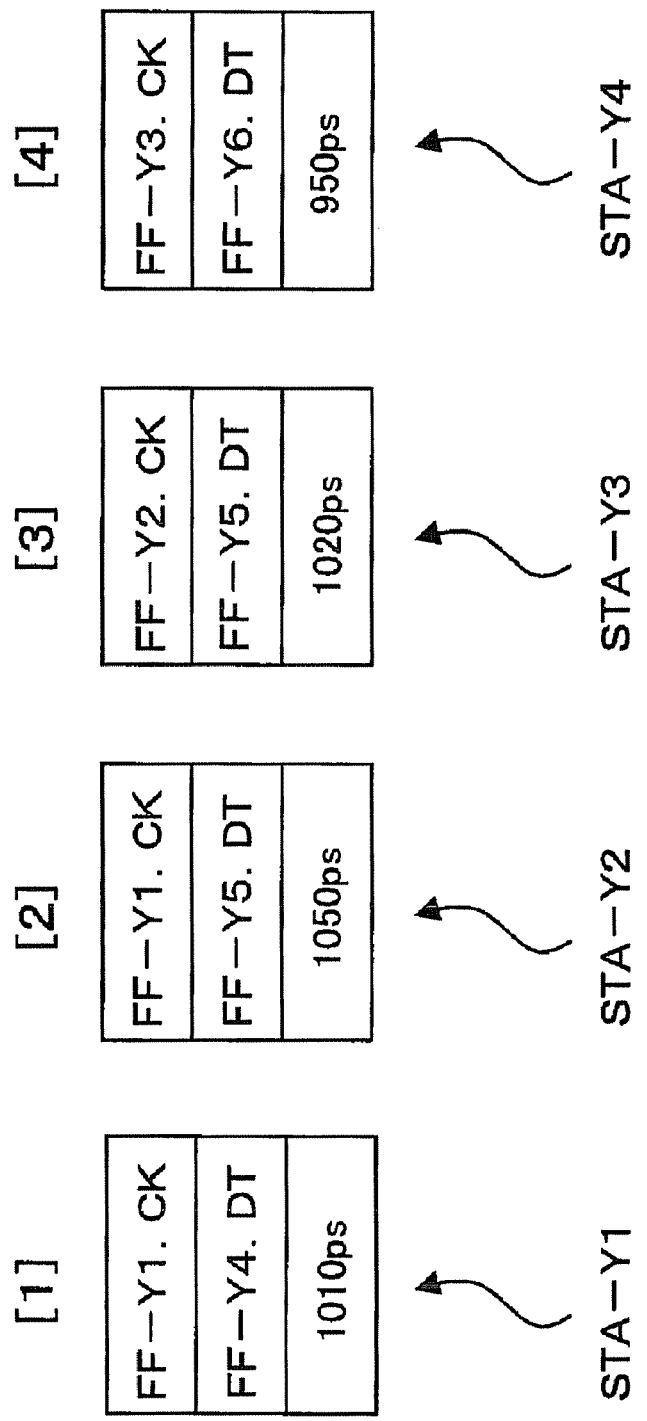
FIG. 6 is a diagram which depicts an example of a path table generated by the STA timing analyzing unit included in the delay analyzing apparatus as an example of the embodiment.

FIG. 5 is a diagram which depicts an example of the delay analysis result generated by the STA timing analyzing unit 23 included in the delay analyzing apparatus 10 as an example of the embodiment. FIG. 6 is a diagram which depicts an example of a path table generated by the STA timing analyzing unit 23.

With such an arrangement, the STA timing analyzing unit 23 generates the STA calculation result for each FF-FF path by performing the aforementioned static timing analysis using the STA for all the FF-FF paths included in the logic circuit. Here, the STA calculation result is composed of the clock pin address of the flip-flop on the data transmission side, the data pin address of the flip-flop on the data reception side, and the timing constraint value Tpd for the FF-FF path that connects these flip-flops, as depicted in FIG. 5.

Description will be made regarding an arrangement employing the logic circuit Y depicted in FIG. 3 as an example. The STA timing analyzing unit 23 performs the aforementioned static timing analysis using the STA for all the FF-FF paths included in the logic circuit Y, i.e., the FF-FF paths P-Y1 through P-Y4. By performing this static timing analysis, the STA timing analyzing unit 23 generates the path table which specifies the STA calculation results STA-Y1 through STA-Y4 for the FF-FF paths P-Y1 through P-Y4 as depicted in FIG. 6.

As depicted in FIG. 6, the path table specifies, as the STA calculation result STA-Y1 for the FF-FF path P-Y1, the clock pin address of the flip-flop FF-Y1 on the data transmission side, the data pin address of the flip-flop FF-Y4 on the data reception side, and a 1010 ps timing constraint value (Tpd) for the FF-FF path that connects these flip-flops.

In a similar way, the path table specifies, as the STA calculation result STA-Y2 for the FF-FF path P-Y2, the clock pin address of the flip-flop FF-Y1 on the data transmission side, the data pin address of the flip-flop FF-Y5 on the data reception side, and a 1050 ps timing constraint value (Tpd) for the FF-FF path that connects these flip-flops. Furthermore, the path table specifies, as the STA calculation result STA-Y3 for the FF-FF path P-Y3, the clock pin address of the flip-flop FF-Y2 on the data transmission side, the data pin address of the flip-flop FF-Y5 on the data reception side, and a 1020 ps timing constraint value (Tpd) for the FF-FF path that connects these flip-flops. Moreover, the path table specifies, as the STA calculation result STA-Y4 for the FF-FF path P-Y4, the clock pin address of the flip-flop FF-Y3 on the data transmission side, the data pin address of the flip-flop FF-Y6 on the data reception side, and a 950 ps timing constraint value (Tpd) for the FF-FF path that connects these flip-flops.

With such an arrangement, the STA timing analyzing unit 23 is configured such that, in a case in which the aforementioned Expression (2) is satisfied for the STA calculation results for all the FF-FF paths included in the logic circuit, the STS timing analyzing unit 23 stores these STA calculation results in the path information DB 19.

(3-4) STA Path Sorting Unit 24

Figure 7:
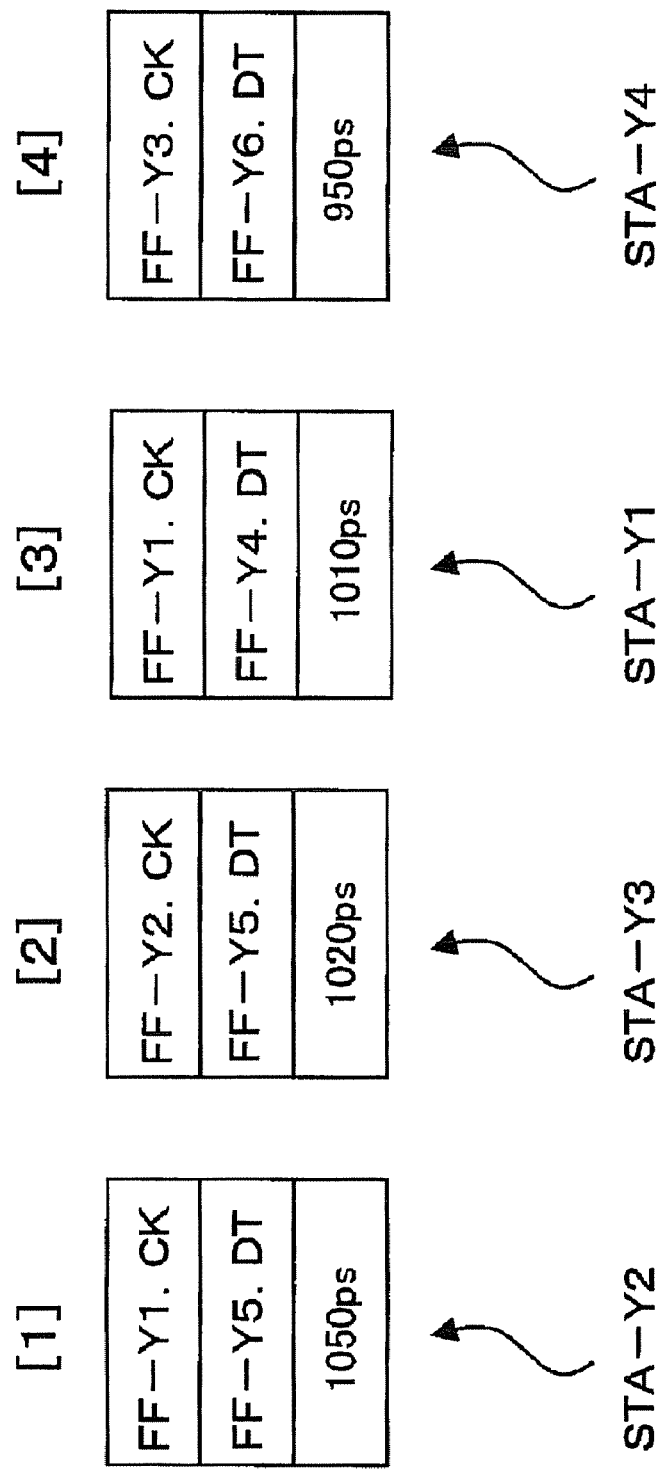
FIG. 7 is a diagram which depicts an example of a maximum delay sorting result generated by an STA path sorting unit included in the delay analyzing apparatus as an example of the embodiment.

FIG. 7 is a diagram which depicts an example of a maximum delay sorting result 30 generated by the STA path sorting unit 24 included in the delay analyzing apparatus 10 as an example of the embodiment.

The STA path sorting unit 24 sorts the delay analysis results for the multiple FF-FF paths in order of the maximum delay, thereby generating the maximum delay sorting result.

Specific description will be made regarding an arrangement employing the logic circuit Y depicted in FIG. 3 as an example. The STA path sorting unit 24 sorts the STA calculation results STA-Y1 through STA-Y4 (see FIG. 6) for the FF-FF paths P-Y1 through P-Y4 generated by the STA timing analyzing unit 23 in descending order of the timing constraint value Tpd for the FF-FF path (e.g., in worst case order). Thus, the STA path sorting unit 24 generates the maximum delay sorting result sorted in the order STA-Y2, STA-Y3, STA-Y1, and STA-Y4, as depicted in FIG. 7.

(3-5) SSTA Path Calculation Unit 25

The SSTA path calculation unit 25 repeatedly performs processing in which a path is selected from the multiple paths in order of the maximum delay based upon the maximum delay sorting result, and the probability density function is generated for each path between the flip-flops thus selected, thereby generating the probability density function for multiple paths between the flip-flops.

In the present embodiment, the SSTA path calculation unit 25 sequentially selects an FF-FF path from the multiple FF-FF paths included in the logic circuit, in order of the sorting results obtained by the STA path sorting unit 24, and performs the statistical timing analysis (SSTA timing check) using the SSTA for each FF-FF path thus selected. That is to say, the SSTA path calculation unit 25 selects (acquires) an FF-FF path in worst case order of the data path delay value (in descending order of the data path delay value), and performs the statistical timing analysis using the SSTA for each FF-FF path (interval) thus selected.

Specific description will be made below regarding a calculation method for the statistical timing analysis using the SSTA, with reference to FIGS. 8 and 9.

Figure 8:
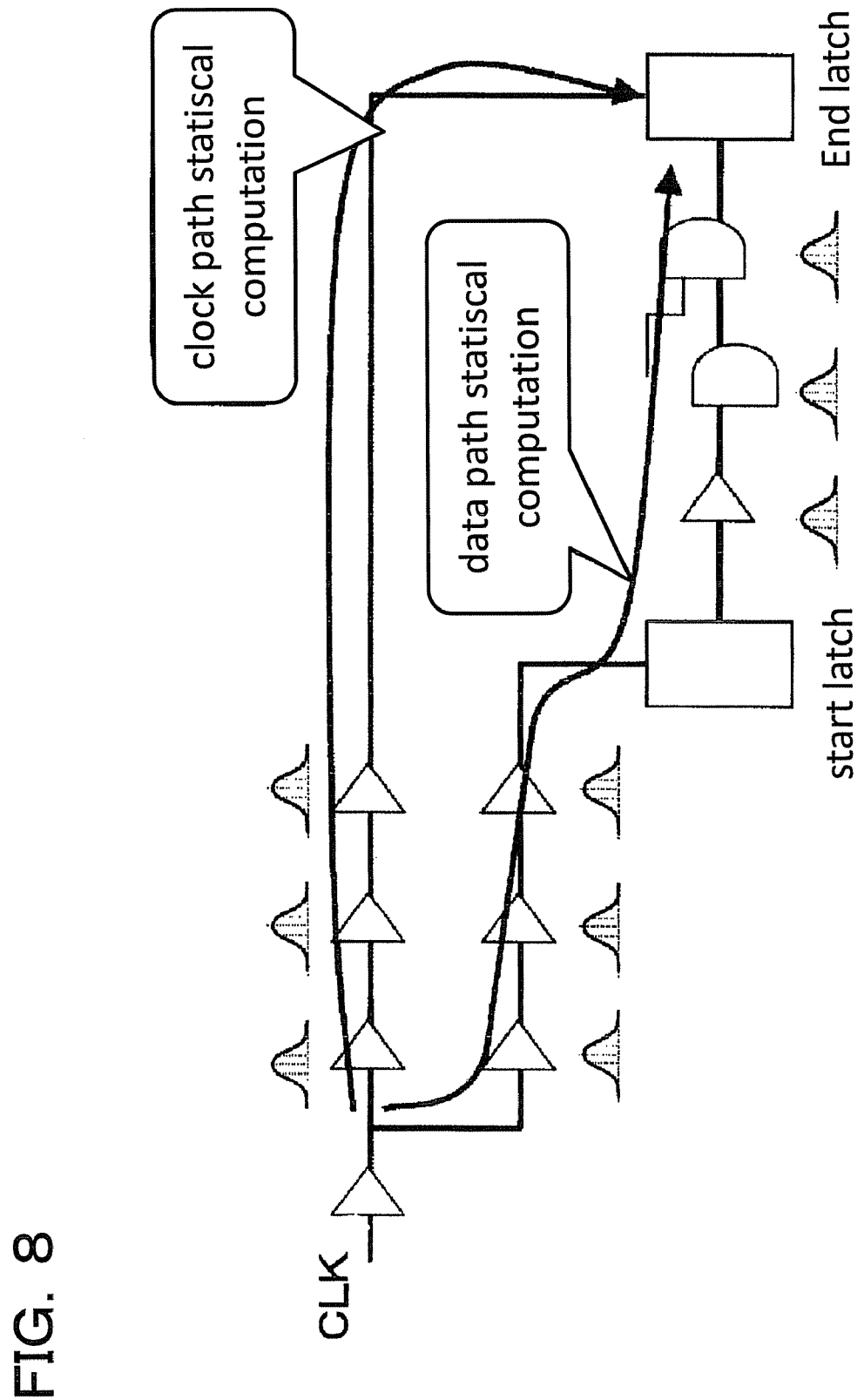
FIG. 8 is a diagram for describing a function of an SSTA path calculation unit included in the delay analyzing apparatus as an example of the embodiment.
Figure 9:
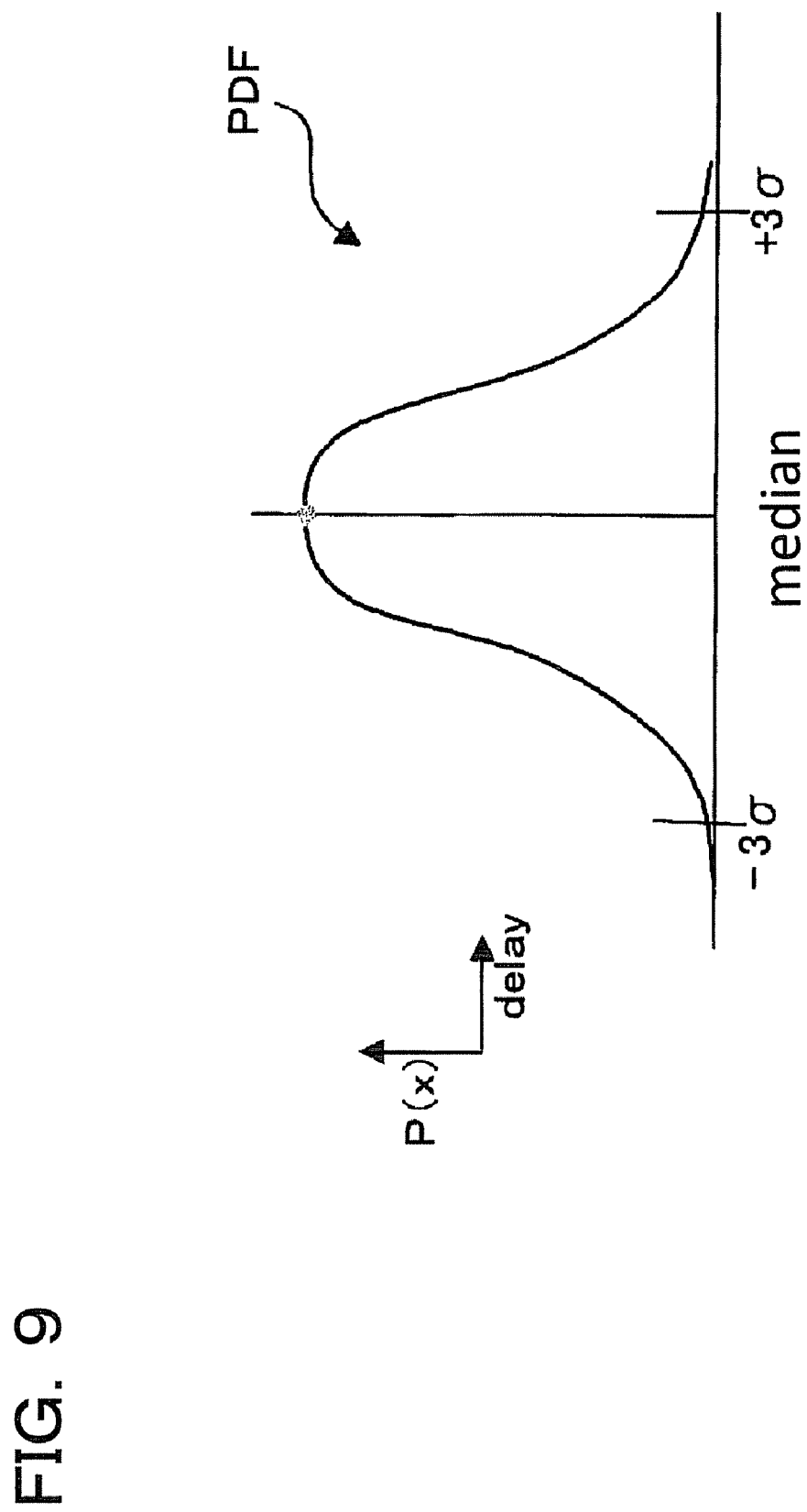
FIG. 9 is a diagram which depicts an example of a probability density function for an FF-FF (Flip Flop to Flip Flop) path generated by the SSTA path calculation unit included in the delay analyzing apparatus as an example of the embodiment.

FIG. 8 is a diagram for describing the function of the SSTA path calculation unit 25 included in the delay analyzing apparatus 10 as an example of the embodiment. FIG. 9 is a diagram which depicts an example of the probability density function for the FF-FF path generated by the SSTA path calculation unit 25.

In the static timing analysis using the STA, the delays due to the gates and the nets arranged on the FF-FF path are simply added. On the other hand, in the statistical timing analysis using the SSTA, the gates and the nets are handled assuming that they have delay distributions. Accordingly, in the statistical timing analysis using the SSTA, by adding the delay distributions for the gates and the nets arranged on the FF-FF path thus selected, such an arrangement provides the probability density function (delay distribution) for the FF-FF path thus selected. With such an arrangement, the delay distribution for each of the gates and the nets can be obtained by referring to the scattering information in the SSTA element library stored in the SSTA element library DB 20. The term "selected FF-FF path" represents information with respect to a flip-flop pair which is a combination of a flip-flop on the data transmission side and a flip-flop on the data reception side.

Furthermore, in the static timing analysis using the STA, as depicted in FIG. 8, statistical timing analysis is performed in a block-based manner for the gates between a flip-flop pair (the "start latch" and the "end latch" in FIG. 8) and a clock circuit (see "CLK" in FIG. 8) which supplies a clock signal to the flip-flop pair. The term "block-based statistical timing analysis" represents a method in which calculation is comprehensively performed for all the paths between the two points that form the flip-flop pair (see "Data path statistical computation" and "Clock path statistical computation" in FIG. 8). For example, description will be made regarding an arrangement in which the delay is calculated at a gate output terminal. In this example, in the case of employing a simple addition method, the delay distribution due to a given gate is added to the delay distribution upstream of the given gate, using statistical sum calculation. The statistical sum is calculated by calculating the convolution integral. In a case in which two FF-FF paths join together, a statistical MAX computation is performed for the probability density function for each FF-FF path (not depicted), as described later.

Description will be made regarding an example of the static timing analysis using the STA with reference to an arrangement employing the logic circuit X depicted in FIG. 2. In this example, the SSTA path calculation unit 25 performs the statistical timing analysis using the SSTA for an FF-FF path selected from among multiple FF-FF paths, thereby calculating the delay distributions that correspond to the clock path delay values Tc1 and Tc2 and the data path delay value Td. Furthermore, the SSTA path calculation unit 25 calculates the delay distribution that corresponds to the timing constraint value Tpd for the FF-FF path. Tsetup represents the setup time for the flip-flop FF_X2 on the data reception side.

$$Tpd=Tc1+Td-Tc2+Tsetup \quad (3)$$

Then, the SSTA path calculation unit 25 generates the probability density function PDF for the FF-FF path P-X3, based upon the result obtained using the aforementioned Expression (3). In the present embodiment, as depicted in FIG. 9, the probability density function PDF is represented by a normal distribution with the horizontal axis as the delay and with the vertical axis as the probability. Furthermore, the median delay (see "median" in FIG. 9), the delay value at the +3σ point (worst side standard deviation; see "+3σ" in FIG. 9), and the delay value at the −3σ point (best side standard deviation; see "−3σ" in FIG. 9) are set for the probability density function PDF generated by the SSTA path calculation unit 25.

Thus, the SSTA path calculation unit 25 generates the probability density functions for the FF-FF paths included in the logic circuit.

Figure 10:
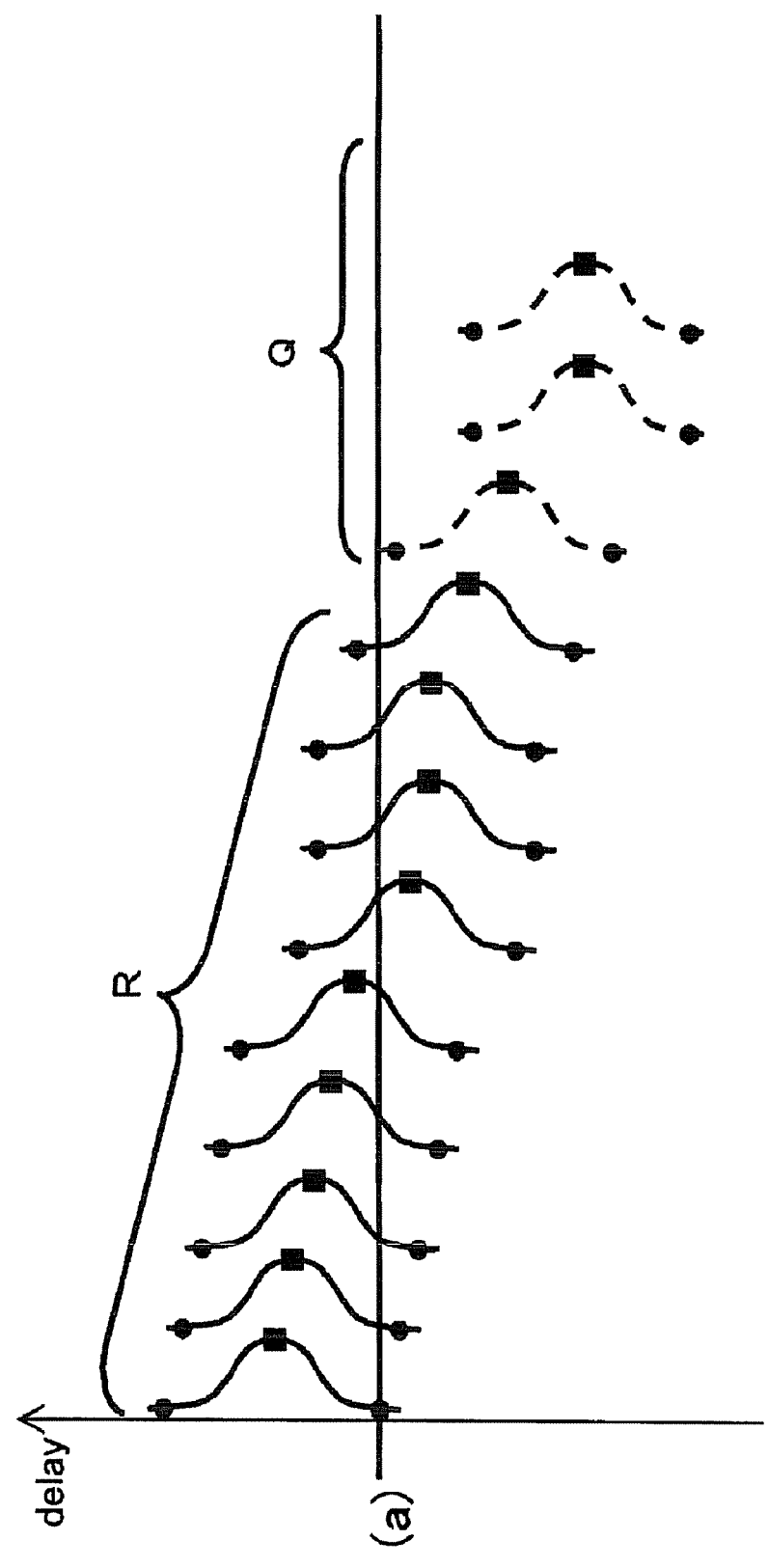
FIG. 10 is a diagram which depicts an example of the probability density function for an FF-FF path generated by the SSTA path calculation unit included in the delay analyzing apparatus as an example of the embodiment.
Figure 11:
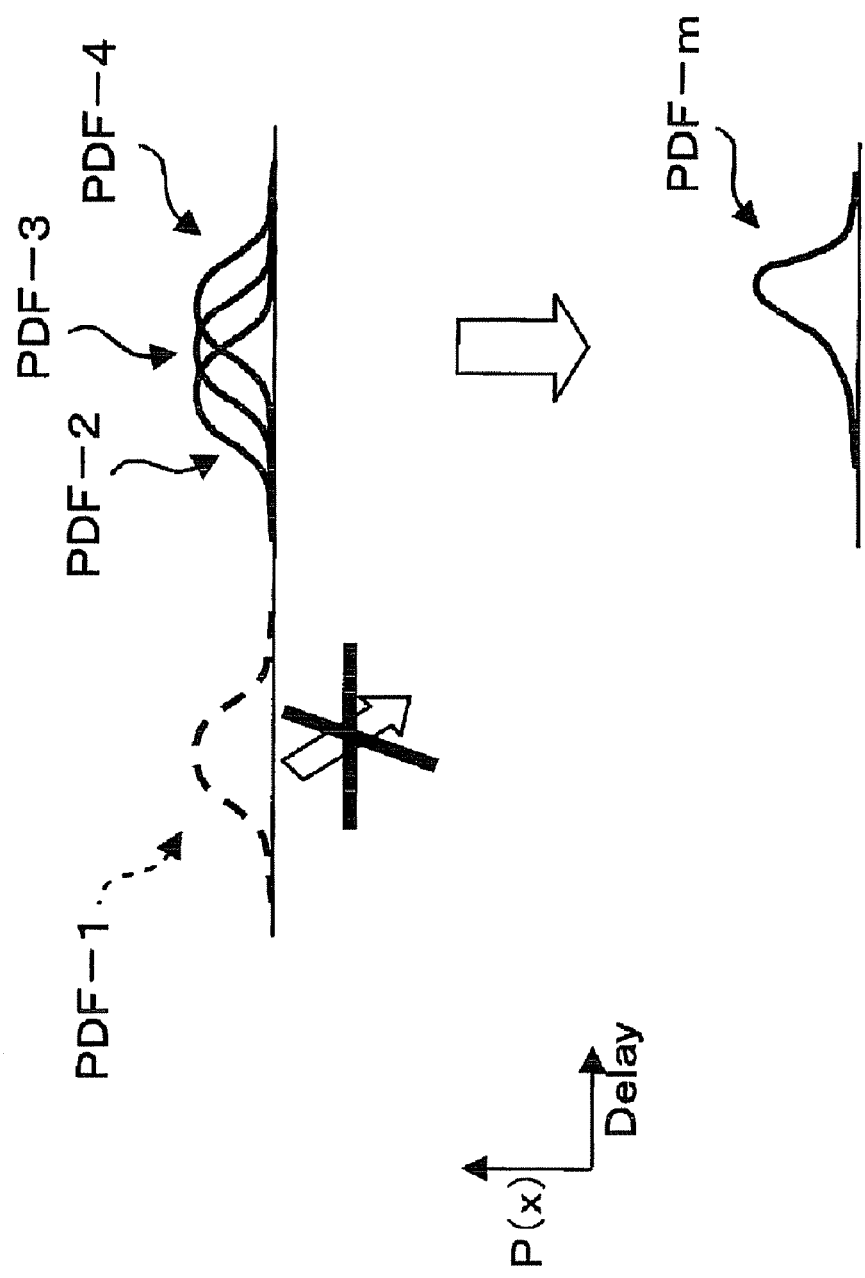
FIG. 11 is a diagram which depicts an example of the probability density function generated by the SSTA path calculation unit and a statistical MAX calculation unit included in the delay analyzing apparatus as an example of the embodiment.
Figure 12:
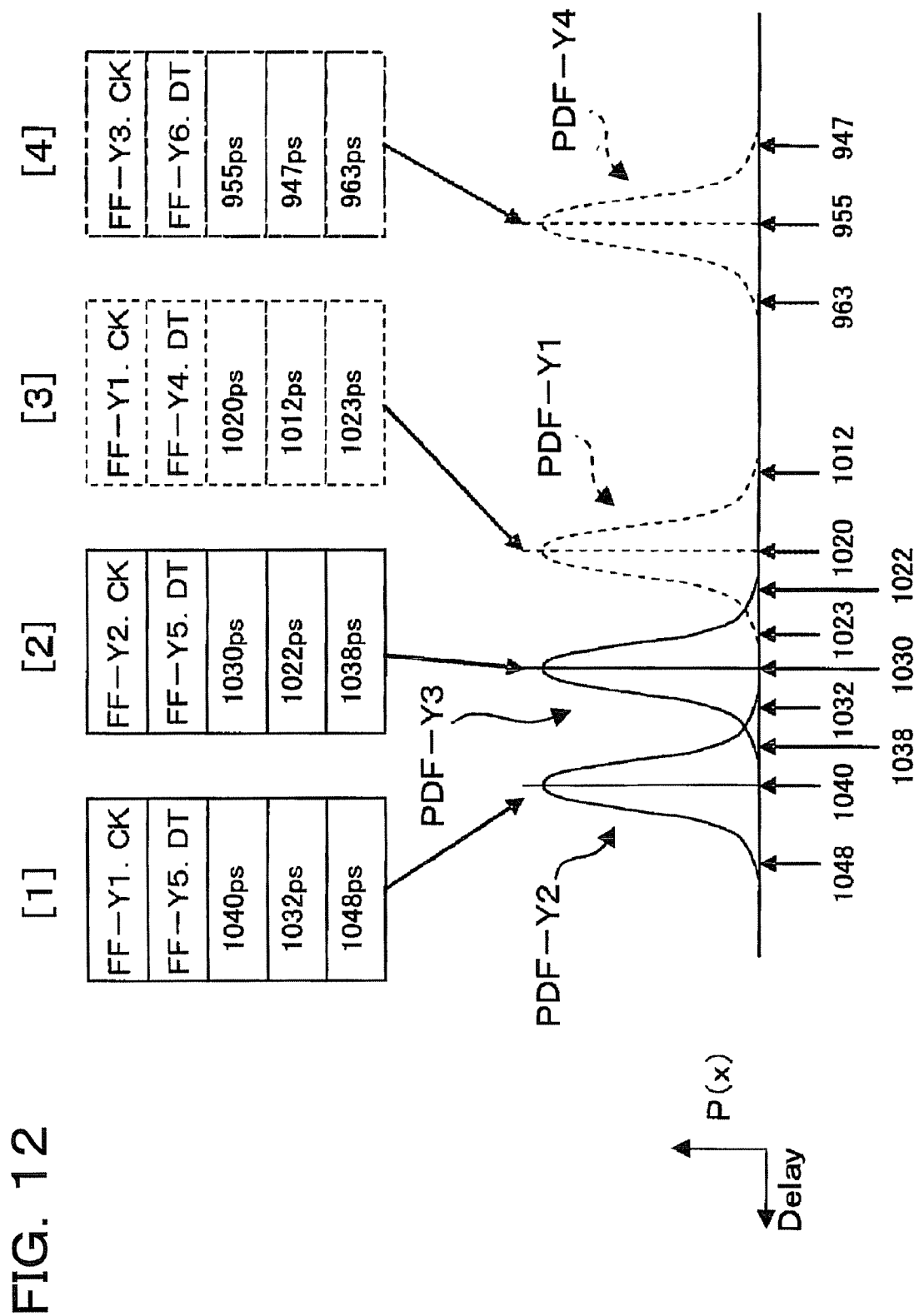
FIG. 12 is a diagram which depicts an example of the probability density function for an FF-FF path generated by the SSTA path calculation unit included in the delay analyzing apparatus as an example of the embodiment.

FIG. 10 is a diagram which depicts an example of the probability density functions for the FF-FF paths generated by the SSTA path calculation unit 25 included in the delay analyzing apparatus 10, as an example of the embodiment. FIG. 11 is a diagram which depicts an example of the probability density functions generated by the SSTA path calculation unit 25 and the statistical MAX calculation unit 26. FIG. 12 is a diagram which depicts an example of the probability density functions for the FF-FF paths generated by the SSTA path calculation unit 25.

Furthermore, in the present embodiment, the SSTA path calculation unit 25 repeatedly selects an FF-FF path from among the multiple FF-FF paths in the order sorted by the STA path sorting unit 24 until a predetermined condition is satisfied.

These predetermined condition is satisfied in a case in which the SSTA path calculation unit 25 selects an FF-FF path which does not affect the probability density function and the cumulative distribution function for the semiconductor integrated circuit as a whole. Specifically, the predetermined condition is satisfied in a case in which the delay value at the +3σ point exceeds a threshold value. The threshold value is set based upon the delay value at the −3σ point of the probability density function for the FF-FF path sorted as the first probability density function by the STA path sorting unit 24. In the present embodiment, the threshold value is set to the delay value at the −3σ point of the probability density function for the FF-FF path sorted as the first probability density function by the STA path sorting unit 24. In the present embodiment, the predetermined condition is satisfied in a case in which the probability density function for an FF-FF path thus selected does not overlap with the probability density function for the FF-FF path thus sorted as the first probability density function by the STA path sorting unit 24.

With such an arrangement, the SSTA path calculation unit 25 performs the aforementioned statistical timing analysis using the SSTA for the FF-FF path thus selected every time the FF-FF path is selected, until the predetermined condition is satisfied. That is to say, the SSTA path calculation unit 25 generates the probability density functions for a portion of the FF-FF paths, excluding the FF-FF paths for which the predetermined condition is not satisfied.

A description will be made with reference to FIG. 10, for example. The SSTA path calculation unit 25 selects an FF-FF path from among multiple FF-FF paths (twelve FF-FF paths in the example depicted in FIG. 10) in the order sorted by the STA path sorting unit 24 (in the order starting from the left in the drawing in an example depicted in FIG. 10). The SSTA path calculation unit 25 performs the statistical timing analysis using the SSTA for the FF-FF path thus selected. The SSTA path calculation unit 25 repeatedly performs the aforementioned selection and analysis until the predetermined condition is satisfied. In this case, the predetermined condition is satisfied in a case in which the delay value at the +3σ point in the probability density function for the FF-FF path thus selected exceeds a threshold value (see the reference symbol "(a)" in FIG. 10).

Accordingly, the SSTA path calculation unit 25 generates the probability density functions (nine probability density functions in this example; see the reference symbol "R" in FIG. 10) for a portion of the FF-FF paths selected from the multiple FF-FF paths, excluding the FF-FF paths for which the predetermined condition is not satisfied. The SSTA path calculation unit 25 does not generate the probability density functions (three probability density functions in this example; see the reference symbol "Q" in FIG. 10) for the FF-FF paths for which the predetermined condition is not satisfied.

Then, the SSTA path calculation unit 25 determines that such a portion of the FF-FF paths for which the predetermined condition is satisfied matches the effective FF-FF paths that affect the probability density function and the cumulative distribution function for the entire semiconductor integrated circuit, and transmits the FF-FF paths thus determined to the statistical MAX calculation unit 26.

Next, description will be made with reference to FIG. 11. In a case in which the STA calculation results for the FF-FF paths P-1 through P-4 (not depicted) are stored in the path information DB 19, the SSTA path calculation unit 25 selects an FF-FF path in the order sorted by the STA path sorting unit 24 (in the order P-4, P-3, P-2, and P-1, in this example). The SSTA path calculation unit 25 performs the statistical timing analysis using the SSTA for the FF-FF path thus selected. The SSTA path calculation unit 25 repeatedly performs the aforementioned selection and analysis until the predetermined condition is satisfied. In this case, the predetermined condition is satisfied in a case in which the probability density function for the FF-FF path thus selected does not overlap with the probability density function PDF-4 for the FF-FF path P-4 thus sorted as the first probability density function.

Accordingly, the SSTA path calculation unit 25 generates the probability density functions PDF-2 through PDF-4, which are a portion of the FF-FF paths selected from among the multiple FF-FF paths P-1 through P-4, excluding the FF-FF path P-1 for which the predetermined condition is not satisfied. That is to say, the SSTA path calculation unit 25 does not generate the probability density function PDF-1 for the FF-FF path P-1.

Then, the SSTA path calculation unit 25 determines that the FF-FF paths P-2 through P-4 are effective FF-FF paths that affect the probability density function and the cumulative distribution function for the entire semiconductor integrated circuit, and transmits the probability density functions PDF-2 through PDF-4 for the FF-FF paths to the statistical MAX calculation unit 26 described later.

Next, description will be made regarding an arrangement employing the logic circuit Y depicted in FIG. 3. In a case in which the STA calculation results for the FF-FF paths P-Y1 through P-Y4 included in the logic circuit Y are stored in the path information DB 19, the SSTA path calculation unit 25 selects an FF-FF path in the order sorted by the STA path sorting unit 24 (in the order P-Y2, P-Y3, P-Y1, and P-Y4, in this example; see FIG. 7). The SSTA path calculation unit 25 performs the statistical timing analysis using the SSTA for the FF-FF path thus selected. The SSTA path calculation unit 25 repeatedly performs the aforementioned selection and analysis until the predetermined condition is satisfied. In this case, the predetermined condition is satisfied in a case in which the probability density function for the FF-FF path thus selected does not overlap with the probability density function PDF-Y2 for the FF-FF path P-Y2 thus sorted as the first FF-FF path.

Accordingly, as depicted in FIG. 12, the SSTA path calculation unit 25 generates the probability density functions PDF-Y2 and PDF-Y3 for the FF-FF paths P-Y2 and P-Y3 which are a portion of the FF-FF paths selected from the multiple FF-FF paths P-Y1 through P-Y4, excluding the FF-FF paths P-Y1 and P-Y4 for which the predetermined condition is not satisfied. That is to say, the SSTA path calculation unit 25 does not generate the probability density functions PDF-Y1 and PDF-Y4 for the FF-FF paths P-Y1 and P-Y4.

As depicted in FIG. 12, for the probability density function PDF-Y2, the median delay is set to 1040 ps, the delay value at the −3σ point is set to 1032 ps, and the delay value at the +3σ point is set to 1048 ps. In a similar way, for the probability density function PDF-Y3, the median delay is set to 1030 ps, the delay value at the −3σ point is set to 1022 ps, and the delay value at the +3σ point is set to 1038 ps.

Although the probability density function PDF-Y1 is not generated in the present embodiment, for the probability density function PDF-Y1, the median delay could be set to 1020 ps, the delay value at the −3σ point could be set to 1012 ps, and the delay value at the +3σ point could be set to 1023 ps. Furthermore, for the probability density function PDF-Y4, the median delay could be set to 955 ps, the delay value at the −3σ point could be set to 947 ps, and the delay value at the +3σ point could be set to 963 ps (see the broken line in FIG. 12).

Then, the SSTA path calculation unit 25 determines that the FF-FF paths P-Y1 through P-Y3 as the effective FF-FF paths that affect the probability density function and the cumulative distribution function for the entire semiconductor circuit, and transmits the probability density functions PDF-Y1 through PDF-Y3 for these FF-FF paths to the statistical MAX calculation unit 26

(3-6) Statistical MAX Calculation Unit 26

Figure 13:
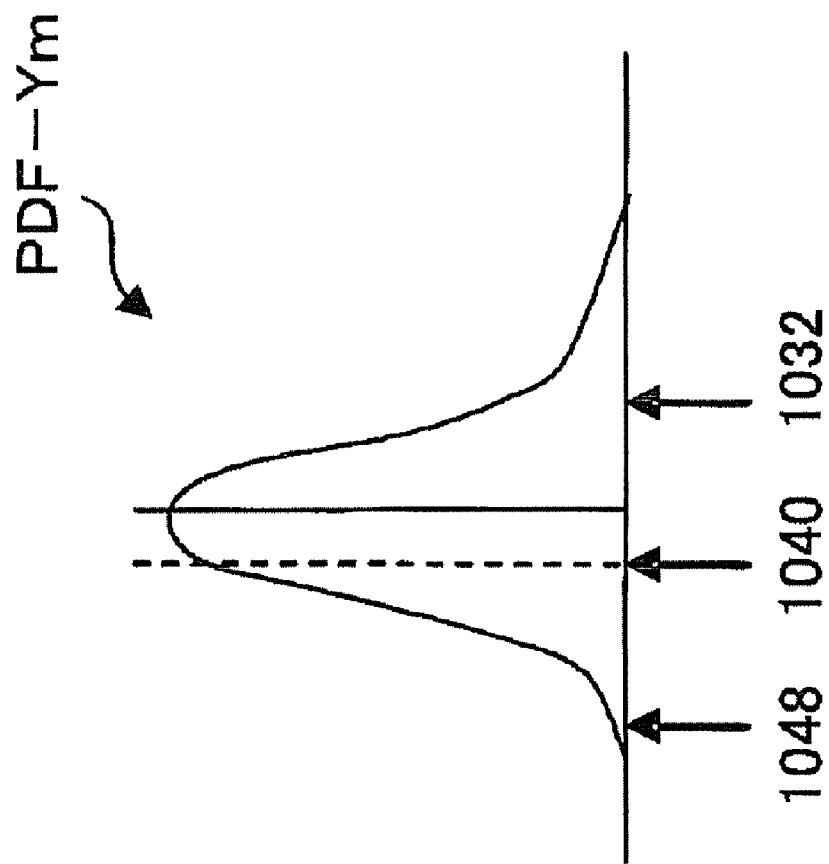
FIG. 13 is a diagram which depicts an example of the probability density function of an entire semiconductor integrated circuit generated by the statistical MAX calculation unit included in the delay analyzing apparatus as an example of the embodiment.

FIG. 13 is a diagram which depicts an example of the probability density function for the entire semiconductor integrated circuit generated by the statistical MAX calculation unit 26 included in the delay analyzing apparatus 10.

The statistical MAX calculation unit 26 performs the statistical MAX calculation (statistical maximum value calculation) for the probability density functions for all the FF-FF paths thus generated.

A description will be made with reference to FIG. 11. The statistical MAX calculation unit 26 generates the probability density function PDF-m for the entire semiconductor integrated circuit by performing the statistical MAX calculation for the probability density functions PDF-2 through PDF-4 for the FF-FF paths thus generated by the SSTA path calculation unit 25.

Next, description will be made regarding an arrangement employing the logic circuit Y depicted in FIG. 3. The statistical MAX calculation unit 26 performs the statistical MAX calculation for the probability density functions PDF-Y1 through PDF-Y3 (see FIG. 12) for the FF-FF paths thus generated by the SSTA path calculation unit 25, thereby generating the probability density function PDF-m for the entire semiconductor integrated circuit as depicted in FIG. 13.

(3-7) Cumulative Distribution Function Generating Unit 27

Figure 14:
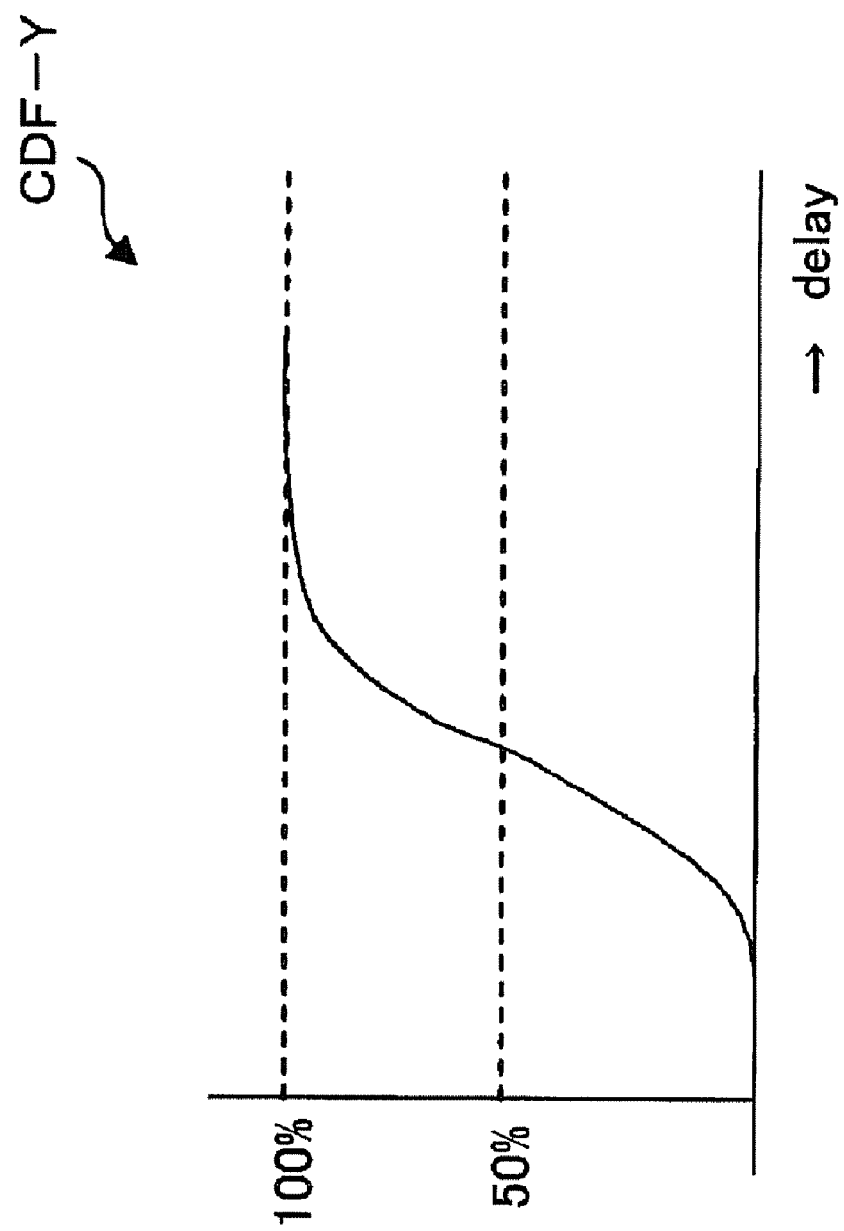
FIG. 14 is a diagram which depicts an example of a cumulative distribution function for an entire semiconductor integrated circuit generated by a cumulative distribution function generating unit included in the delay analyzing apparatus as an example of the embodiment.

FIG. 14 is a diagram which depicts an example of the cumulative distribution function for the entire semiconductor integrated circuit generated by the cumulative distribution function generating unit 27 included in the delay analyzing apparatus 10.

The cumulative distribution function generating unit 27 generates the cumulative distribution function for the entire semiconductor integrated circuit based upon the probability distribution function for the entire semiconductor integrated circuit thus generated by the statistical MAX calculation unit 26.

A description will be made regarding an arrangement employing the logic circuit Y depicted in FIG. 3. The cumulative distribution function generating unit 27 generates a cumulative distribution function CDF-Y for the entire semiconductor integrated circuit as depicted in FIG. 14, by integrating the probability distribution function PDF-Ym (see FIG. 13) for the entire semiconductor integrated circuit thus generated by the statistical MAX calculation unit 26. The cumulative distribution function CDF-Y for the entire semiconductor integrated circuit represents the yield with respect to the frequency for the entire semiconductor integrated circuit.

(3-8) Display Control Unit 28

The display control unit 28 performs a display control operation for instructing the display device 14 described later to display the probability density function (see FIG. 11 and FIG. 13) for the entire semiconductor integrated circuit generated by the statistical MAX calculation unit 26 or, the cumulative distribution function (see FIG. 14) for the entire semiconductor integrated circuit generated by the cumulative distribution function generating unit 27.

(4) Display Device 14

The display device 14 displays the probability density function or the cumulative distribution function for the entire semiconductor integrated circuit under the display control of the display control unit 28. For example, the display device 14 includes a CRT (Cathode Ray Tube) display and an LCD (Liquid Crystal Display).

(5) Operation Procedure for the Delay Analyzing Apparatus 10

Figure 15:
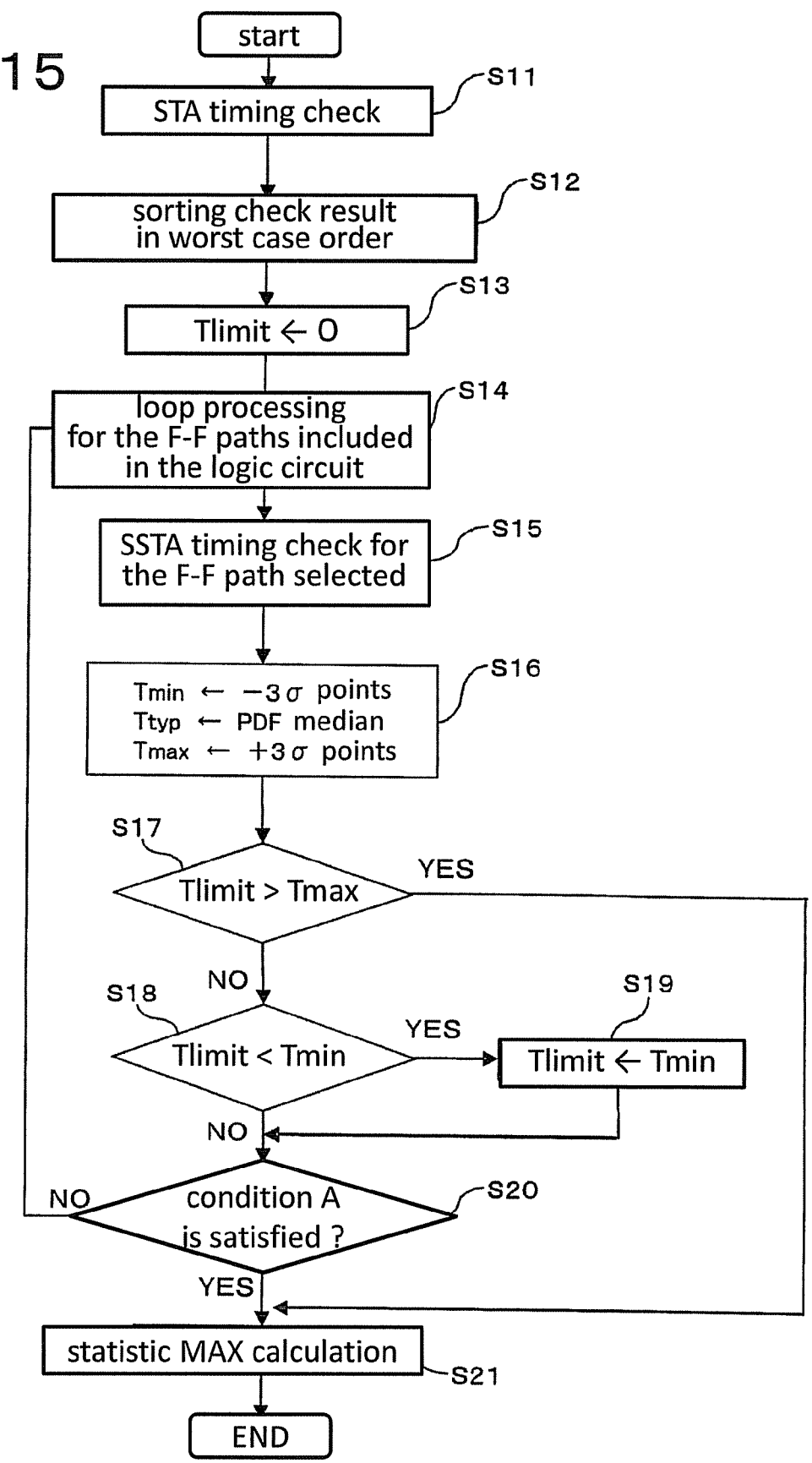
FIG. 15 is a flowchart which depicts an example of an operation procedure for the delay analyzing apparatus according to an example of the embodiment.

Description will be made regarding an example of the operation procedure for the delay analyzing apparatus 10 according to the embodiment thus configured as described above, with reference to the flowchart (Steps S11 through S21) depicted in FIG. 15.

The readout unit 21 reads out the net list, the implementation information, the element library, and the SSTA element library, from en external source, and stores the information thus read out in the main storage unit 12. The delay calculation unit 22 calculates the delay for each logic element, the delay for each flip-flop, and the delay for each net, listed in the net list, based upon the net list, the implementation information, and the element library stored in the main storage unit 12, and stores the delay calculation results in the delay DB 18.

The STA timing analyzing unit 23 calculates the delays for all the FF-FF paths included in the logic circuit by performing the static timing analysis using the STA, and generates the STA calculation results (Step S11).

The STA path sorting unit 24 sorts the STA calculation results for the FF-FF paths thus generated by the STA timing analyzing unit 23 in worst case order of the delay value Tpd for the FF-FF path so as to generate the maximum delay sorting result, and stores the maximum delay sorting result thus generated in the path information DB 19 (Step S12).

The processing unit 13 initializes the variable Tlimit (Tlimit=0; Step S13). The variable Tlimit represents a threshold value (see the symgol "a" in FIG. 10, for example).

The SSTA path calculation unit 25 performs loop processing (Steps S15 through S20) for the FF-FF paths included in the logic circuit in the order sorted by the STA path sorting unit 24 (Step S14).

The SSTA path calculation unit 25 selects an FF-FF path from among the multiple FF-FF paths included in the logic circuit, and performs the statistical timing analysis using the SSTA for the FF-FF path thus selected (Step S15). That is to say, the SSTA path calculation unit 25 acquires the FF-FF paths in worst case order of the data path delay value for the FF-FF path, and performs the statistical timing analysis using the SSTA for the FF-FF path (interval) thus acquired.

The SSTA path calculation unit 25 generates the probability density function for the FF-FF path thus selected, by performing the statistical timing analysis using the SSTA (Step S16). The SSTA path calculation unit 25 sets the median delay of the probability density function for the FF-FF path thus selected for a variable Ttyp. Furthermore, the SSTA path calculation unit 25 sets the delay value at the −3σ point of the probability density function for the FF-FF path thus selected for a variable Tmin. Moreover, the SSTA path calculation unit 25 sets the delay value at the +3σ point of the probability density function for the FF-FF path thus selected for a variable Tmax (Step S16).

The SSTA path calculation unit 25 makes a comparison between the variable Tlimit and the variable Tmax (Step S17).

As the result of the comparison, in a case in which the variable Tmax is equal to or greater than the variable Tlimit (see "NO" route from Step S17), the SSTA path calculation unit 25 makes a comparison between the variable Tlimit and the variable Tmin (Step S18).

As the result of the comparison the comparison, in a case in which the variable Tmin is greater than the variable Tlimit (see "YES" route from Step S18), the SSTA path calculation unit 25 sets the value of the variable Tmin for the variable Tlimit (Step S19), and the flow proceeds to Step S20. In this case, the SSTA path calculation unit 25 resets the variable Tlimit to a greater value than that set in the current stage.

On the other hand, in a case in which the variable Tmin is equal to or smaller than the variable Tlimit (see "NO" route from Step S18), the flow proceeds to Step S20.

The SSTA path calculation unit 25 judges whether or not the condition A is satisfied (Step S20). The condition A is satisfied in a case in which the FF-FF path that is the current processing target matches the FF-FF path sorted as the last FF-FF path by the STA path sorting unit 24.

As the result of the judgment, in a case in which the condition A is not satisfied (see "NO" route from Step S20), the FF-FF path sorted by the STA path sorting unit 24 as the next FF-FF path to the current processing target FF-FF path is selected, and the flow proceeds to Step S14.

On the other hand, in a case in which the condition A is satisfied (see "YES" route from Step S20), the SSTA path calculation unit 25 judges that the probability density functions have been generated for all the FF-FF paths included in the logic circuit, and transmits the probability density functions for the FF-FF paths thus generated to the statistical MAX calculation unit 26.

The statistical MAX calculation unit 26 generates the probability density function for the entire semiconductor integrated circuit by performing the statistical MAX calculation for the probability density functions thus generated by the SSTA path calculation unit 25 (Step S21).

On the other hand, using the comparison result obtained in Step S17, in a case in which the variable Tmax is smaller than the variable Tlimit (see "YES" route from Step S17), the processing in Steps S14 through S20 ends, and the flow proceeds to Step S21.

Then, the cumulative distribution function generating unit 27 generates the cumulative distribution function for the entire semiconductor integrated circuit by integrating the probability density function for the entire semiconductor integrated circuit thus generated by the statistical MAX calculation unit 26.

Subsequently, the display control unit 28 instructs the display device 14 to display the probability density function for the entire semiconductor integrated circuit thus generated by the statistical MAX calculation unit 26, or the cumulative distribution function for the entire semiconductor integrated circuit thus generated by the cumulative distribution function generating unit 27, whereupon the processing ends.

As described above, with the delay analyzing apparatus 10 of the embodiment, the static timing analysis using the STA is performed for all the FF-FF paths included in the logic circuit, and the analysis results are sorted in the worst case of the delay. Then, an FF-FF path is selected in the order thus sorted, and the statistical timing analysis using the SSTA is performed for the FF-FF path thus selected.

The statistical timing analysis using the SSTA requires execution of the processing such as addition of the delay distributions for the gates and nets for each FF-FF path and so forth, leading to long processing time. Furthermore, in order to improve the calculation precision in the statistical timing analysis using the SSTA, there is a need to increase the number of data points in the delay distributions for the gates and the nets for each FF-FF path, leading to an increased amount of execution memory. Accordingly, it is not practical to execute the statistical timing analysis using the SSTA for all the FF-FF paths included in the logic circuit. The FF-FF paths on the worst case side has great effects on the statistical MAX calculation. In some cases, the FF-FF paths on the lower side (FF-FF paths on the side opposite to the worst case side, e.g., FF-FF paths on the best case side) hardly has effects on the statistical MAX calculation.

Accordingly, in the present embodiment, as described above, giving consideration to the fact that the probability density functions for all the FF-FF paths do not always affect the cumulative distribution function for the entire semiconductor integrated circuit which represents the yield curve for the entire semiconductor integrated circuit, judgment is made for each FF-FF path whether or not the probability density function for the FF-FF path affects the probability density function for the entire semiconductor integrated circuit. That is to say, a minimum number of FF-FF paths which are to be used as the targets of the statistical timing analysis using the SSTA are selected. After the selection, the statistical timing analysis using the SSTA ends.

With such an arrangement, the statistical timing analysis using the SSTA is executed for a minimum number of FF-FF paths for maintaining the analysis precision. Thus, in the case of calculating the yield curve for the entire semiconductor integrated circuit, such an arrangement reduces the processing time preferable for the statistical timing analysis using the SSTA. Furthermore, such an arrangement reduces the number of data points in the delay distributions for the gates and nets for each FF-FF path, thereby conserving the memory.

The delay analyzing apparatus, the delay analyzing method, and the delay analyzing program are not restricted to the above-described embodiments. Rather, various modifications may be made without departing from the scope of the invention.

FIG. 16 is a diagram which depicts an example of the probability density functions for the FF-FF paths generated by the SSTA path calculation unit 25 included in the delay analyzing apparatus 10 as another embodiment.

For example, description has been made in the above-described embodiment regarding an arrangement in which the threshold value for setting the predetermined condition is set to the delay value at the $-3\sigma$ point of the probability density function for the FF-FF path sorted as the first FF-FF path by the STA path sorting unit 24 (see FIG. 10). However, the present embodiment is not restricted to such an arrangement. Also, a desired threshold value may be set based upon the delay value at the $-3\sigma$ point of the probability density function for the FF-FF path sorted as the first FF-FF path by the STA path sorting unit 24, for example.

For example, as depicted in FIG. 16, in some cases, there is a difference between the worst case order based upon the static timing analysis results using the STA and the worst case order based upon the statistical timing analysis results using the SSTA. This is because, the delay values at the $\pm 3\sigma$ points are not constant over the FF-FF paths. In this case, there are FF-FF paths having negligibly small effects on the cumulative distribution function for the semiconductor integrated circuit as a whole although in a strict sense such FF-FF paths have some effect on the cumulative distribution function (see the reference symbol "(b)" in FIG. 16). With such an arrangement, the user could set the threshold value for setting the predetermined condition to a threshold value (see the reference symbol "(c)" in FIG. 16) obtained by applying a margin to the delay value (see the reference symbol "(a)" in FIG. 16) at the $-3\sigma$ point of the probability density function for the FF-FF path sorted as the first FF-FF path by the STA path sorting unit 24. Such an arrangement allows the statistical timing analysis using the SSTA to be performed for a certain larger number of FF-FF paths (see the reference symbol "S"

in FIG. 16), excluding the FF-FF paths having a delay value at the +3σ point greater than the threshold value (see the reference symbol "T" in FIG. 16).

Description has been made in the aforementioned embodiment regarding an arrangement in which a normal distribution with a delay value at the +3σ point thus set is used as the probability density function for each FF-FF path. However, the present embodiment is not restricted to such an arrangement. Also, the distribution curve may be defined and represented in the form of a table.

With such an arrangement, the processing unit 13 executes the delay analyzing program so as to provide functions as the readout unit 21, the delay calculation unit 22, the STA timing analyzing unit 23, the STA path sorting unit 24, the SSTA path calculation unit 25, the statistical MAX calculation unit 26, the cumulative distribution function generating unit 27, and the display control unit 28.

The delay analyzing program for providing the functions as the readout unit 21, the delay calculation unit 22, the STA timing analyzing unit 23, the STA path sorting unit 24, the SSTA path calculation unit 25, the statistical MAX calculation unit 26, the cumulative distribution function generating unit 27, and the display control unit 28 is provided in the form of a program stored in a computer-readable recording medium such as a CD (CD-ROM, CD-R, CD-RW, etc.), DVD (DVD-ROM, DVD-RAM, DVD-R, DVD+R, DVD-RW, DVD+RW, HD-DVD, etc.), BD (Blu-ray disk), magnetic disk, optical disk, magneto-optical disk, semiconductor storage device, or the like. With such an arrangement, the computer reads out the program from the recording medium, and transmits the program thus read out to, and stores the program in an internal storage device or an external storage device, following which the program thus stored is used. Also, an arrangement may be made in which the program is stored in a storage device (medium) such as a magnetic disk, an optical disk, a magneto-optical disk, a semiconductor storage device, or the like, and the program is supplied to the computer via a communication line.

When providing the functions as the readout unit 21, the delay calculation unit 22, the STA timing analyzing unit 23, the STA path sorting unit 24, the SSTA path calculation unit 25, the statistical MAX calculation unit 26, the cumulative distribution function generating unit 27, and the display control unit 28, the program stored in the internal storage device is executed by a microprocessor included in the computer. With such an arrangement, the program stored in the storage medium may be read out and executed by the computer.

The term "computer" as used in the present embodiment conceptually includes a combination of hardware and an operating system, and represents the hardware which operates under the control of the operating system. In a case in which an application program is operated in a stand-alone manner without the need of an operating system, the hardware alone corresponds to the computer. The hardware includes at least a microprocessor such as a CPU or the like and a means for reading out a computer program stored in a recording medium. In the present embodiment, the delay analyzing apparatus 10 has a function as a computer.

Furthermore, as the recording medium in the present embodiment, various kinds of computer-readable media may be employed, examples of which include an IC card, a ROM cartridge, a magnetic tape, a punch card, an internal storage device (memory such as RAM or ROM) included in a computer, an external storage device, printed material on which a symbol such as a barcode is printed, and so forth, in addition to the aforementioned flexible disk, CD, DVD, BD, magnetic disk, optical disk, magneto-optical disk, and semiconductor storage device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A delay analyzing apparatus for analyzing a delay that occurs in paths between flip-flops in a logic circuit of a semiconductor integrated circuit, the delay analyzing apparatus comprising:
a delay calculation unit that generates delay calculation results based upon wiring and layout information with respect to the logic circuit;
a delay analyzing unit that generates delay analysis results for the paths by adding delay information with respect to logic elements and flip-flops included in the logic circuit based upon the generated delay calculation results to thereby calculate sums, and by multiplying the calculated sums by a scattering coefficient;
a delay analysis result sorting unit that sorts the generated delay analysis results for the paths in order of a maximum delay, thereby generating a maximum delay sorting result;
a probability density path calculation unit that performs processing, by a computer, in which a respective path is selected from among the paths in order of the maximum delay based upon the maximum delay sorting result, and a probability density function is generated for the selected path, and repeats performing said processing to thereby generate probability density functions for the selected paths; and
a statistical maximum value calculation unit that performs, by a computer, a statistical maximum value calculation for the generated probability density functions.

2. A delay analyzing apparatus according to claim 1, wherein the delay calculation unit generates the delay calculation results for each logic element, flip-flop and wiring included in the logic circuit.

3. A delay analyzing apparatus according to claim 1, wherein the delay analyzing unit generates a delay that occurs between flip-flops included in the logic circuit to thereby generate a respective delay analysis result for a respective path.

4. A delay analyzing apparatus according to claim 3, wherein the delay analysis result sorting unit sorts the generated delay analysis results in descending order of delay that occurs between the flip-flops, thereby generating the maximum delay sorting result.

5. A delay analyzing apparatus according to claim 4, wherein
the probability density path calculation unit repeats performing said processing until a predetermined condition is satisfied, to thereby generate the probability density functions for the selected paths, and
the selected paths being a portion of the paths in the logic circuit, excluding the paths in the logic circuit for which the predetermined condition is not satisfied.

6. A delay analyzing apparatus according to claim 5, wherein the predetermined condition is satisfied in a case in which a worst side standard deviation of the probability density function for a selected path exceeds a threshold generated based upon a best side standard deviation of the probability density function for the path sorted as a first path by the delay analysis result sorting unit.

7. A delay analyzing apparatus according to claim 5, wherein the statistical maximum value calculation unit performs the statistical maximum value calculation for the generated probability density functions, thereby generating a probability density function for the semiconductor integrated circuit.

8. A delay analyzing apparatus according to claim 7, further comprising;
a cumulative distribution function generating unit that generates a cumulative distribution function for the semiconductor integrated circuit based upon the generated probability density function for the semiconductor integrated circuit.

9. A delay analyzing apparatus according to claim 8, further comprising:
a display unit that displays the probability density function for the semiconductor integrated circuit generated by the statistical maximum value calculation unit or the cumulative distribution function for the semiconductor integrated circuit generated by the cumulative distribution function generating unit.

10. A delay analyzing method for analyzing a delay that occurs in paths between flip-flops in a logic circuit of a semiconductor integrated circuit, the delay analyzing method comprising:
generating delay calculation results based upon wiring and layout information with respect to the logic circuit;
generating delay analysis results for the paths by adding delay information with respect to logic elements and flip-flops included in the logic circuit based upon the generated delay calculation results, to thereby calculate sums, and by multiplying the calculated sums by a scattering coefficient;
sorting the generated delay analysis results for the paths in order of a maximum delay, thereby generating a maximum delay sorting result;
performing processing, by a computer, in which a respective path is selected from among the paths in order of the maximum delay based upon the maximum delay sorting result, and a probability density function is generated for the selected path, and said processing is repeated to thereby generate probability density functions for the selected paths; and
calculating, by a computer, a statistical maximum value for the generated probability density functions.

11. A delay analyzing method according to claim 10, wherein, in the generating delay calculation results, the delay calculation results are generated for each logic element, flip-flop and wiring included in the logic circuit.

12. A delay analyzing method according to claim 10, wherein, in the generating delay analysis results, the delay that occurs between flip-flops included in the logic circuit is generated, to thereby generate a respective delay analysis result for a respective path.

13. A delay analyzing method according to claim 12, wherein, in the sorting the generated delay analysis results, the generated delay analysis results are sorted in descending order of delay that occurs between the flip-flops, thereby generating the maximum delay sorting result.

14. A delay analyzing method according to claim 13, wherein
the performing processing repeats performing said processing until a predetermined condition is satisfied, to thereby generate the probability density functions for the selected paths, and
the selected paths excluding the paths in the logic circuit for which the predetermined condition is not satisfied.

15. A delay analyzing method according to claim 14, wherein the predetermined condition is satisfied in a case in which a worst side standard deviation of the probability density function for a selected path exceeds a threshold generated based upon a best side standard deviation of the probability density function for the path sorted as a first path in the delay analysis result sorting step.

16. A delay analyzing method according to claim 14, wherein, in the calculating the statistical maximum value, a statistical maximum value calculation is performed for the generated probability density functions, thereby generating a probability density function for the semiconductor integrated circuit.

17. A delay analyzing method according to claim 16, further comprising:
generating a cumulative distribution function for the semiconductor integrated circuit based upon the generated probability density function for the semiconductor integrated circuit.

18. A non-transitory computer readable medium that stores a delay analyzing program configured for instructing a computer to execute a function for analyzing a delay that occurs between flip-flops in a logic circuit of a semiconductor integrated circuit, the delay analyzing program comprising:
generating delay calculation results based upon wiring and layout information with respect to the logic circuit;
generating delay analysis results for the paths by adding delay information with respect to logic elements and flip-flops included in the logic circuit based upon the generated delay calculation results to thereby calculate sums, and by multiplying the calculated sums by a scattering coefficient;
sorting the generated delay analysis results for the paths in order of a maximum delay, thereby generating a maximum delay sorting result;
performing processing in which a respective path is selected from among the paths in order of the maximum delay based upon the maximum delay sorting result, and a probability density function is generated for the selected path, and repeats performing said processing to thereby generate probability density functions for the selected paths; and
calculating a statistical maximum value for the generated probability density function.

* * * * *

UNITED STATES PATENT AND TRADEMARK OFFICE
CERTIFICATE OF CORRECTION

PATENT NO.        : 8,225,254 B2  
APPLICATION NO.   : 12/534970  
DATED             : July 17, 2012  
INVENTOR(S)       : Hiroyuki Sugiyama Page 1 of 1

It is certified that error appears in the above-identified patent and that said Letters Patent is hereby corrected as shown below:

Column 19, Line 15, In Claim 8, delete "comprising;" and insert -- comprising: --, therefor.
Column 20, Line 57, In Claim 18, delete "function." and insert -- functions. --, therefor.

Signed and Sealed this  
Second Day of October, 2012

David J. Kappos  
*Director of the United States Patent and Trademark Office*